US012213156B2

(12) United States Patent
Takeda et al.

(10) Patent No.: US 12,213,156 B2
(45) Date of Patent: *Jan. 28, 2025

(54) PROCESSING FOR MULTICAST OPERATION USING MULTIPLE SETS OF PROCESSING RESOURCES

(71) Applicant: QUALCOMM Incorporated, San Diego, CA (US)

(72) Inventors: Kazuki Takeda, Minato-ku (JP); Alberto Rico Alvarino, San Diego, CA (US); Le Liu, San Jose, CA (US); Peter Gaal, San Diego, CA (US); Wanshi Chen, San Diego, CA (US); Ayan Sengupta, San Diego, CA (US); Prasad Reddy Kadiri, San Diego, CA (US); Tao Luo, San Diego, CA (US); Mostafa Khoshnevisan, San Diego, CA (US); Juan Montojo, San Diego, CA (US); Umesh Phuyal, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,548

(22) Filed: Sep. 15, 2023

(65) Prior Publication Data

US 2024/0089997 A1 Mar. 14, 2024

Related U.S. Application Data

(63) Continuation of application No. 17/241,696, filed on Apr. 27, 2021, now Pat. No. 11,792,826.
(Continued)

(51) Int. Cl.
*H04W 72/30* (2023.01)
*H04L 1/00* (2006.01)
(Continued)

(52) U.S. Cl.
CPC ........... *H04W 72/30* (2023.01); *H04L 1/0038* (2013.01); *H04W 8/24* (2013.01);
(Continued)

(58) Field of Classification Search
CPC ... H04W 72/30; H04W 8/24; H04W 72/0446; H04W 72/0453; H04W 72/23;
(Continued)

(56) References Cited

U.S. PATENT DOCUMENTS 11,792,826 B2 * 10/2023 Takeda ................. H04L 5/0055
370/329
2007/0189289 A1 8/2007 Frederiksen et al.
(Continued)

FOREIGN PATENT DOCUMENTS

CN 107529147 A * 12/2017 .............. H04W 4/06
WO WO-2021218742 A1 11/2021
(Continued)

OTHER PUBLICATIONS

Li et al., "Information feedback and resource scheduling methods, terminal, and network device", Nov. 4, 2021, English language translation of WO 2021/218742 (Year: 2021).*
(Continued)

*Primary Examiner* — Michael K Phillips
(74) *Attorney, Agent, or Firm* — Holland & Hart LLP

(57) ABSTRACT

Methods, systems, and devices for wireless communications are described. Generally, a user equipment (UE) may support both unicast and multicast downlink signaling, such as on a single component carrier (CC). A UE may receive a unicast message over a first CC during a transmission time
(Continued)

FIG. 9 interval (TTI) using a first set of processing resources. The UE may simultaneously receive a multicast message over the first CC during the same TTI using a second set of processing resources. The first and second sets of processing resources may be associated with first and second hybrid automatic repeat request (HARM) soft buffers, first and second CCs, or first and second transmit/receive points (TRPs).

30 Claims, 21 Drawing Sheets

Related U.S. Application Data

(60) Provisional application No. 63/016,536, filed on Apr. 28, 2020.

(51) Int. Cl.
  *H04W 8/24* (2009.01)
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01)

(58) Field of Classification Search
  CPC .............. H04W 4/06; H04L 1/0038; H04L 2001/0093; H04L 1/0046; H04L 1/0072; H04L 1/1819; H04L 1/1822; H04L 1/1835; H04L 1/1861; H04L 1/1864; H04L 1/1893; H04L 1/1896; H04L 5/001; H04L 5/0055; H04L 5/0064; H04L 5/0053
  See application file for complete search history.

(56) References Cited

U.S. PATENT DOCUMENTS

| | | | |
|---|---|---|---|
| 2009/0279480 A1 | 11/2009 | Rosenqvist et al. | |
| 2012/0281576 A1* | 11/2012 | Yamada | H04W 48/12 370/252 |
| 2013/0194931 A1* | 8/2013 | Lee | H04L 5/0053 370/329 |
| 2014/0029584 A1* | 1/2014 | Qu | H04W 72/23 370/336 |
| 2014/0146737 A1 | 5/2014 | Ohshima et al. | |
| 2014/0226552 A1* | 8/2014 | Niu | H04W 4/06 370/312 |
| 2015/0208269 A1 | 7/2015 | Damnjanovic et al. | |
| 2015/0215929 A1 | 7/2015 | Damnjanovic et al. | |
| 2015/0296488 A1* | 10/2015 | Shimezawa | H04L 5/0094 370/329 |
| 2016/0302225 A1 | 10/2016 | Damnjanovic et al. | |
| 2016/0345311 A1* | 11/2016 | Chen | H04L 5/00 |
| 2017/0272895 A1* | 9/2017 | Park | H04W 8/186 |
| 2017/0273071 A1* | 9/2017 | Nogami | H04W 74/085 |
| 2017/0347341 A1* | 11/2017 | Zhang | H04L 12/189 |
| 2018/0049226 A1 | 2/2018 | Chen et al. | |
| 2018/0102803 A1 | 4/2018 | Alriksson et al. | |
| 2018/0152274 A1 | 5/2018 | Li et al. | |
| 2019/0028225 A1* | 1/2019 | Yang | H04L 1/1825 |
| 2019/0208505 A1* | 7/2019 | Park | H04L 5/0053 |
| 2019/0223164 A1* | 7/2019 | He | H04L 25/0204 |
| 2020/0252978 A1 | 8/2020 | Yi et al. | |
| 2021/0014647 A1 | 1/2021 | Takeda et al. | |
| 2021/0050968 A1* | 2/2021 | Yi | H04L 5/0048 |
| 2022/0182976 A1 | 6/2022 | Jiang et al. | |
| 2022/0278809 A1 | 9/2022 | Papasakellariou | |
| 2022/0369285 A1 | 11/2022 | Takeda et al. | |
| 2023/0023919 A1* | 1/2023 | Qi | H04W 4/06 |
| 2023/0047407 A1 | 2/2023 | Li et al. | |

FOREIGN PATENT DOCUMENTS

| | | |
|---|---|---|
| WO | WO-2022001491 A1 | 1/2022 |
| WO | WO-2022130629 A1 | 6/2022 |

OTHER PUBLICATIONS

Zhang, "The Invention Claims a Method and Device of Wireless Transmission", Dec. 29, 2017, CN, English translation of CN 107529147 A (Year: 2017).*

International Search Report and Written Opinion—PCT/US2021/029622—ISAEPO—Jul. 23, 2021.

Qualcomm Europe: "Multiplexing DL Multicast and Unicast Transmissions", 3GPP Draft, 3GPP TSG-RAN WG1 #44, R1-060463, 3rd Generation Partnership Project (3GPP), Mobile Competence Centre, 650, Route Des Lucioles, F-06921 Sophia-Antipolis Cedex, France, vol. RAN WG1, No. Denver, USA, Feb. 9, 2006, Feb. 13-17, 2005 (Feb. 9, 2006), XP050101403, pp. 1-4, [retrieved on Feb. 9, 2006] the whole document.

* cited by examiner

PROCESSING FOR MULTICAST OPERATION USING MULTIPLE SETS OF PROCESSING RESOURCES

CROSS REFERENCE

The present Application for Patent is a Continuation of U.S. patent application Ser. No. 17/241,696 by TAKEDA et al., entitled "PROCESSING FOR MULTICAST OPERATION USING MULTIPLE SETS OF PROCESSING RESOURCES," filed Apr. 27, 2021, which claims the benefit of U.S. Provisional Patent Application No. 63/016,536 by TAKEDA et al., entitled "PROCESSING FOR MULTICAST OPERATION USING MULTIPLE SETS OF PROCESSING RESOURCES," filed Apr. 28, 2020, each of which is assigned to the assignee hereof, and each of which is expressly incorporated by reference herein.

TECHNICAL FIELD

The following relates generally to wireless communications and more specifically to processing for multicast operation using multiple sets of processing resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support processing for multicast operation, including in conjunction with unicast operation, using multiple sets of processing resources. Generally, a user equipment (UE) may support both unicast and multicast downlink signaling on a single component carrier (CC). A UE may receive a unicast message over a first CC during a transmission time interval (TTI) using a first set of processing resources. The UE may concurrently (e.g., during the same TTI) receive a multicast message over the first CC using a second set of processing resources. The first and second sets of processing resources may be associated with first and second hybrid automatic repeat request (HARQ) processes or resources (e.g., soft buffers), support for communication via first and second CCs, or support for communication via first and second transmit/receive points (TRPs). For instance, a UE may have processing or other resources that would otherwise support communication via a first and second CC, and the UE may borrow processing resources that may otherwise be associated with communication via the second CC to exchange multicast messages on the first CC while using other processing resources of the first CC to exchange unicast messages on the first CC. Having received unicast and multicast messages, the UE may transmit a first feedback message (e.g., an acknowledgement (ACK) message or a negative acknowledgement (NACK) message) for the unicast message. In some cases, the UE may also transmit a second feedback message (e.g., an ACK message or a NACK message) for the multicast message.

A method of wireless communications at a UE is described. The method may include receiving, using a first set of processing resources, a unicast message from a base station over a first CC during a first TTI, receiving, using a second set of processing resources, a multicast message from the base station over the first CC during the first TTI, and transmitting, to the base station using the first set of processing resources, a first feedback message associated with the unicast message.

An apparatus for wireless communications at a UE is described. The apparatus may include a processor, memory coupled (e.g., operatively, communicatively, functionally, electronically, or electrically) with the processor, and instructions stored in the memory. The instructions may be executable by the processor to cause the apparatus to receive, using a first set of processing resources, a unicast message from a base station over a first CC during a first TTI, receive, using a second set of processing resources, a multicast message from the base station over the first CC during the first TTI, and transmit, to the base station using the first set of processing resources, a first feedback message associated with the unicast message.

Another apparatus for wireless communications at a UE is described. The apparatus may include means for receiving, using a first set of processing resources, a unicast message from a base station over a first CC during a first TTI, receiving, using a second set of processing resources, a multicast message from the base station over the first CC during the first TTI, and transmitting, to the base station using the first set of processing resources, a first feedback message associated with the unicast message.

A non-transitory computer-readable medium storing code for wireless communications at a UE is described. The code may include instructions executable by a processor to receive, using a first set of processing resources, a unicast message from a base station over a first CC during a first TTI, receive, using a second set of processing resources, a multicast message from the base station over the first CC during the first TTI, and transmit, to the base station using the first set of processing resources, a first feedback message associated with the unicast message.

Some examples of the method, apparatuses, and non-transitory computer-readable medium described herein may further include operations, features, means, or instructions for transmitting, to the base station using the second set of processing resources, a second feedback message associated with the multicast message.

Some examples of the method, apparatuses, and non-transitory computer-readable medium described herein may further include operations, features, means, or instructions for transmitting, to the base station, a capability message indicating the first set of processing resources and the second set of processing resources, where receiving the unicast message and receiving the multicast message may be based on transmitting the indication.

Some examples of the method, apparatuses, and non-transitory computer-readable medium described herein may further include operations, features, means, or instructions for receiving, from the base station, a first control message including a grant of resources for the unicast message, where receiving the unicast message may be based on receiving the first control message, and receiving, from the base station, a second control message including a grant of resources for the multicast message, where receiving the multicast message may be based on receiving the second control message.

Some examples of the method, apparatuses, and non-transitory computer-readable medium described herein may further include operations, features, means, or instructions for identifying a first set of search spaces for the first control message and a second set of search spaces for the second control message, monitoring the first set of search spaces, where receiving the first control message may be based on monitoring the first set of search spaces, and monitoring the second set of search spaces, where receiving the second control message may be based on monitoring the second set of search spaces.

Some examples of the method, apparatuses, and non-transitory computer-readable medium described herein may further include operations, features, means, or instructions for performing, based on monitoring the first set of search spaces, a first hash function based on a UE identifier associated with the UE, where receiving the first control message may be based on performing the first hash function, and performing, based on monitoring the second set of search spaces, a second hash function based on a group identifier associated with a group of UEs including the UE, where receiving the second control message may be based on performing the second hash function.

In some examples of the method, apparatuses, and non-transitory computer-readable medium described herein, a quantity of blind decoding procedures associated with the first set of search spaces and the second set of search spaces may be greater than a quantity of blind decoding procedures associated with the first CC.

In some examples of the method, apparatuses, and non-transitory computer-readable medium described herein, a quantity of blind decoding procedures associated with the first set of search spaces and the second set of search spaces may be less than or equal to a quantity of blind decoding procedures associated with the first CC.

Some examples of the method, apparatuses, and non-transitory computer-readable medium described herein may further include operations, features, means, or instructions for identifying a set of search spaces including the first set of search spaces and the second set of search spaces, prioritizing a subset of the set of search spaces, the subset including the first set of search spaces and the second set of search spaces, where monitoring the first set of search spaces and monitoring the second set of search spaces may be based on prioritizing the subset of the set of search spaces, and refraining from monitoring a remainder of the set of search spaces based on prioritizing the subset of the set of search spaces.

In some examples of the method, apparatuses, and non-transitory computer-readable medium described herein, prioritizing the subset of the set of search spaces may include operations, features, means, or instructions for prioritizing one or more search spaces associated with the multicast message over one or more search spaces associated with the unicast message, or prioritizing one or more search spaces associated with the unicast message over one or more search spaces associated with the multicast message.

Some examples of the method, apparatuses, and non-transitory computer-readable medium described herein may further include operations, features, means, or instructions for receiving a prioritization message from the base station, the prioritization message indicating the subset of the set of search spaces, where prioritizing the subset of the set of search spaces may be based on receiving the prioritization message.

In some examples of the method, apparatuses, and non-transitory computer-readable medium described herein, the unicast message and the multicast message may be received in a different order than the first control message and the second control message, or where the first feedback message and a second feedback message associated with the multicast message may be transmitted in a different order than the unicast message and the multicast message may be received, or a combination thereof.

In some examples of the method, apparatuses, and non-transitory computer-readable medium described herein, the first set of processing resources may be associated with a first HARQ process, and where the second set of processing resources may be associated with a second HARQ process.

In some examples of the method, apparatuses, and non-transitory computer-readable medium described herein, the unicast message and the multicast message at least partially overlap in time.

In some examples of the method, apparatuses, and non-transitory computer-readable medium described herein, one of the first set of processing resources and the second set of processing resources may be associated with the first CC of a first frequency band, and another of the first set of processing resources and the second set of processing resources may be associated with a second CC of the first frequency band.

In some examples of the method, apparatuses, and non-transitory computer-readable medium described herein, one of the first set of processing resources and the second set of processing resources may be associated with the first CC of a first frequency band, and another of the first set of processing resources and the second set of processing resources may be associated with a second CC of a second frequency band.

In some examples of the method, apparatuses, and non-transitory computer-readable medium described herein, one of the first set of processing resources and the second set of processing resources may be associated with a first TRP, and another of the first set of processing resources and the second set of processing resources may be associated with a second TRP.

Some examples of the method, apparatuses, and non-transitory computer-readable medium described herein may further include operations, features, means, or instructions for receiving, using the first set of processing resources, a first additional unicast message or a first additional multicast message from the base station over the first CC during a second TTI, and receiving, using the second set of processing resources, a second additional unicast message or a second additional multicast message from the base station over a second CC during the second TTI.

Some examples of the method, apparatuses, and non-transitory computer-readable medium described herein may further include operations, features, means, or instructions for receiving, using the first set of processing resources, a first control message over the first CC, the first control message including a grant of resources for the first additional unicast message or the first additional multicast message, where receiving the first additional unicast message or the first additional multicast message may be based on receiving the first control message, and receiving, using the second set of processing resources, a second control message over the first CC, the second control message including a grant of resources for the second additional unicast message or the second additional multicast message, where receiving the second additional unicast message or the second additional multicast message over the second CC may be based on receiving the second control message.

Some examples of the method, apparatuses, and non-transitory computer-readable medium described herein may further include operations, features, means, or instructions for receiving, using the first set of processing resources, a first control message over the first CC, the first control message including a grant of resources for the first additional unicast message or the first additional multicast message, where receiving the first additional unicast message or the first additional multicast message may be based on receiving the first control message, and receiving, using the second set of processing resources, a second control message over the second CC, the second control message including a grant of resources for the second additional unicast message or the second additional multicast message, where receiving the second additional unicast message or the second additional multicast message over the second CC may be based on receiving the second control message.

A method of wireless communications at a base station is described. The method may include transmitting, to a UE, a unicast message over a first CC during a first TTI, transmitting, to the UE, a multicast message over the first CC during the first TTI, and receiving, from the UE, a first feedback message associated with the unicast message.

An apparatus for wireless communications at a base station is described. The apparatus may include a processor, memory coupled (e.g., operatively, communicatively, functionally, electronically, or electrically) with the processor, and instructions stored in the memory. The instructions may be executable by the processor to cause the apparatus to transmit, to a UE, a unicast message over a first CC during a first TTI, transmit, to the UE, a multicast message over the first CC during the first TTI, and receive, from the UE, a first feedback message associated with the unicast message.

Another apparatus for wireless communications at a base station is described. The apparatus may include means for transmitting, to a UE, a unicast message over a first CC during a first TTI, transmitting, to the UE, a multicast message over the first CC during the first TTI, and receiving, from the UE, a first feedback message associated with the unicast message.

A non-transitory computer-readable medium storing code for wireless communications at a base station is described. The code may include instructions executable by a processor to transmit, to a UE, a unicast message over a first CC during a first TTI, transmit, to the UE, a multicast message over the first CC during the first TTI, and receive, from the UE, a first feedback message associated with the unicast message.

Some examples of the method, apparatuses, and non-transitory computer-readable medium described herein may further include operations, features, means, or instructions for receiving, from the UE, a second feedback message associated with the multicast message.

Some examples of the method, apparatuses, and non-transitory computer-readable medium described herein may further include operations, features, means, or instructions for receiving, from the UE, a capability message indicating a first set of processing resources for receiving the unicast message by the UE and a second set of processing resources for receiving the multicast message by the UE, where transmitting the unicast message and transmitting the multicast message may be based on receiving the indication.

In some examples of the method, apparatuses, and non-transitory computer-readable medium described herein, the first set of processing resources may be associated with a first HARQ process at the UE, and where the second set of processing resources may be associated with a second HARQ process at the UE.

In some examples of the method, apparatuses, and non-transitory computer-readable medium described herein, the unicast message and the multicast message at least partially overlap in time.

In some examples of the method, apparatuses, and non-transitory computer-readable medium described herein, one of the first set of processing resources and the second set of processing resources may be associated with the first CC of a first frequency band, and another of the first set of processing resources and the second set of processing resources may be associated with a second CC of the first frequency band.

In some examples of the method, apparatuses, and non-transitory computer-readable medium described herein, one of the first set of processing resources and the second set of processing resources may be associated with the first CC of a first frequency band, and another of the first set of processing resources and the second set of processing resources may be associated with a second CC of a second frequency band.

In some examples of the method, apparatuses, and non-transitory computer-readable medium described herein, one of the first set of processing resources and the second set of processing resources may be associated with a first TRP, and another of the first set of processing resources and the second set of processing resources may be associated with a second TRP.

Some examples of the method, apparatuses, and non-transitory computer-readable medium described herein may further include operations, features, means, or instructions for transmitting, to the UE, a first control message including a grant of resources for the unicast message, where transmitting the unicast message may be based on receiving the first control message, and transmitting, to the UE, a second control message including a grant of resources for the multicast message, where transmitting the multicast message may be based on receiving the second control message.

Some examples of the method, apparatuses, and non-transitory computer-readable medium described herein may further include operations, features, means, or instructions for identifying a first set of search spaces for the first control message and a second set of search spaces for the second control message, where transmitting the first control message includes transmitting the first control message over one or more of the first set of search spaces, and where transmitting the second control message including transmitting the second control message over one or more of the second set of search spaces.

Some examples of the method, apparatuses, and non-transitory computer-readable medium described herein may further include operations, features, means, or instructions for transmitting, to the UE, a prioritization message indicating at least a portion of the first set of search spaces and at least a portion of the second set of search spaces.

In some examples of the method, apparatuses, and non-transitory computer-readable medium described herein, the unicast message and the multicast message may be transmitted in a different order than the first control message and the second control message may be transmitted, or where the first feedback message and a second feedback message associated with the multicast message may be received in a different order than the unicast message and the multicast message may be transmitted, or a combination thereof.

Some examples of the method, apparatuses, and non-transitory computer-readable medium described herein may further include operations, features, means, or instructions for transmitting, to the UE, a first additional unicast message or a first additional multicast message from the base station over the first CC during a second TTI, and transmitting, to the UE, a second additional unicast message or a second additional multicast message from the base station over a second CC during the second TTI.

Some examples of the method, apparatuses, and non-transitory computer-readable medium described herein may further include operations, features, means, or instructions for transmitting, to the UE, a first control message over the first CC, the first control message including a grant of resources for the first additional unicast message or the first additional multicast message, where transmitting the first additional unicast message or the first additional multicast message may be based on transmitting the first control message, and transmitting, to the UE, a second control message over the first CC, the second control message including a grant of resources for the second additional unicast message or the second additional multicast message, where transmitting the second additional unicast message or the second additional multicast message over the second CC may be based on transmitting the second control message.

Some examples of the method, apparatuses, and non-transitory computer-readable medium described herein may further include operations, features, means, or instructions for transmitting, to the UE, a first control message over the first CC, the first control message including a grant of resources for the first additional unicast message or the first additional multicast message, where transmitting the first additional unicast message or the first additional multicast message may be based on transmitting the first control message, and transmitting, to the UE, a second control message over the second CC, the second control message including a grant of resources for the second additional unicast message or the second additional multicast message, where transmitting the second additional unicast message or the second additional multicast message over the second CC may be based on transmitting the second control message over the first CC.

DETAILED DESCRIPTION

Figure 1:
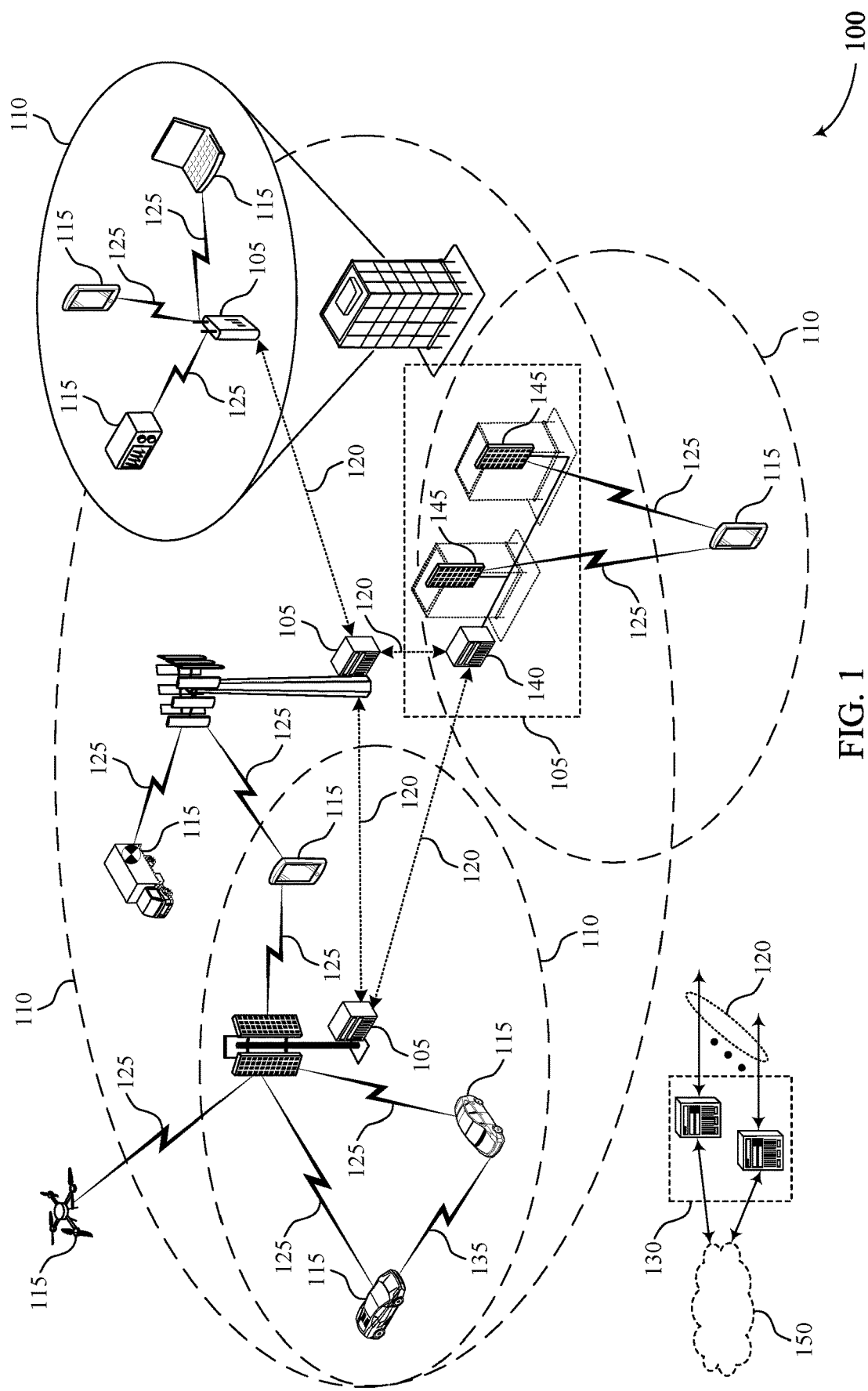
FIG. 1 illustrates an example of a system for wireless communications that supports processing for multicast operation using multiple sets of processing resources in accordance with aspects of the present disclosure.

A base station may communicate with one or more user equipments (UEs) via one or more unicast messages, multicast messages, and broadcast messages. A base station may transmit a unicast message over a single physical downlink shared channel (PDSCH) for reception by a specific set of UEs. The base station may schedule a multicast message via a downlink control information (DCI) message, and the cyclic redundancy check (CRC) may be scrambled using a multiple broadcast multiple service (MBMS) radio network temporary identifier (M-RNTI) or other identifier for a group of UEs.

A receiving UE may be limited in its capability to support different streams of concurrent (e.g., overlapping or time-multiplexed) communication (e.g., to process signals and provide feedback for multiple streams of communication). For example, a UE may have limited processing capabilities for blind decoding procedures, may be limited to maintaining a fixed number of hybrid automatic repeat request (HARM) processes (e.g., per time period, per component carrier (CC), or per transmitting device), or may have other limitations.

In some examples, to support both unicast and multicast communications within a same time period, a UE may utilize a first set of processing resources for receiving and processing unicast messages, and may utilize a second set of processing resources for receiving and processing multicast messages. The first and second sets of processing resources may be associated with supporting communications via first and second CCs, or via first and second transmit/receive points (TRPs). The UE may utilize the first set of processing resources and the second set of processing resources to simultaneously (e.g., within a same transmission time interval (TTI) or other time period, at least partially overlapping in time) receive, process, provide feedback, or a combination thereof, to both unicast and multicast messages on the same CC. For example, the UE may borrow the processing resources that may otherwise be associated with communications via a second CC or a second TRP to support multicast communications on a same CC or via a same TRP as unicast communications.

As one example, a UE may have sufficient processing resources available to support carrier aggregation (CA). The UE may be capable of performing CA across, for instance, three CCs. When configured in CA with three CCs, the UE may utilize first, second, and third sets of processing resources to receive downlink communications from the base station over the three respective CCs. However, the UE may also be able to use the second and third sets of processing resources to perform intra-band CA reception over the second and third CCs, and may use the first set of processing resources to simultaneously perform multicast reception and processing over the second CC. Thus, the UE may receive, process, and provide one or more feedback messages (e.g., ACK messages, negative acknowledgement (NACK) messages, or any combination thereof) for unicast messages over the second CC using the second and third set of processing resources, and may simultaneously receive, process and provide feedback messages for multicast messages over the second CC using the first set of processing resources. As another example, like resource-borrowing techniques may additionally or alternatively be utilized to support unicast and multicast communications with respect to resources that the UE may otherwise use to support multi-TRP communications.

Aspects of the disclosure are initially described in the context of wireless communications systems. Aspects of the disclosure are further illustrated by and described with reference to signal processing schemes and process flows. Aspects of the disclosure are further illustrated by and described with reference to apparatus diagrams, system diagrams, and flowcharts that relate to processing for multicast operation using multiple sets of processing resources.

FIG. 1 illustrates an example of a wireless communications system 100 that supports processing for multicast operation using multiple sets of processing resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some UEs 115 may support both unicast and multicast downlink signaling on a single CC. A UE 115 thus may receive a unicast message over a first CC during a TTI using a first set of processing resources. Processing resources may refer to processing capabilities, or baseband processing capabilities. In some examples, the UE 115 may receive a multicast message over the first CC using a second set of processing resources. For example, the UE 115 may receive the multicast message and the unicast message during the same TTI. The multicast message and the unicast message may partially or completely overlap in time (e.g., be at least partially concurrent) within the TTI. The first and second sets of processing resources may be associated with first and second HARQ processes or resources (e.g., soft buffers), support for communication via first and second CCs, or support for communication via first and second TRPs. For instance, the UE 115 may have processing or other resources that would otherwise support communication via a first and second CC, and the UE 115 may borrow processing resources that may otherwise be associated with communication via the second CC to exchange multicast messages on the first CC while using other processing resources of the first CC to exchange unicast messages on the first CC. Processing resources may include borrowing a number of baseband processing units (e.g., a number of multiplications the UE 115 can perform, a number of code words that the UE 115 is capable of decoding) within a unit of time (e.g., a slot, a subframe, or a symbol) per CC. In some examples, processing resources may include an amount of information the UE 115 is capable of storing in a soft-buffer for data for a given CC. The UE 115 may use processing resources associated with a first CC to perform unicast operations. The UE 115 may borrow such processing resources associated with a second CC, and may utilize them for receiving multicast messages on the first CC. Having received unicast and multicast messages, the UE may transmit a first feedback message (e.g., an ACK message or a NACK message) for the unicast message. In some cases, the UE may also transmit a second feedback message (e.g., an ACK message or a NACK message) for the multicast message. Such borrowing may additionally or alternatively occur in the context of resources otherwise associated with different TRPs, or different HARQ processes.

Figure 2:
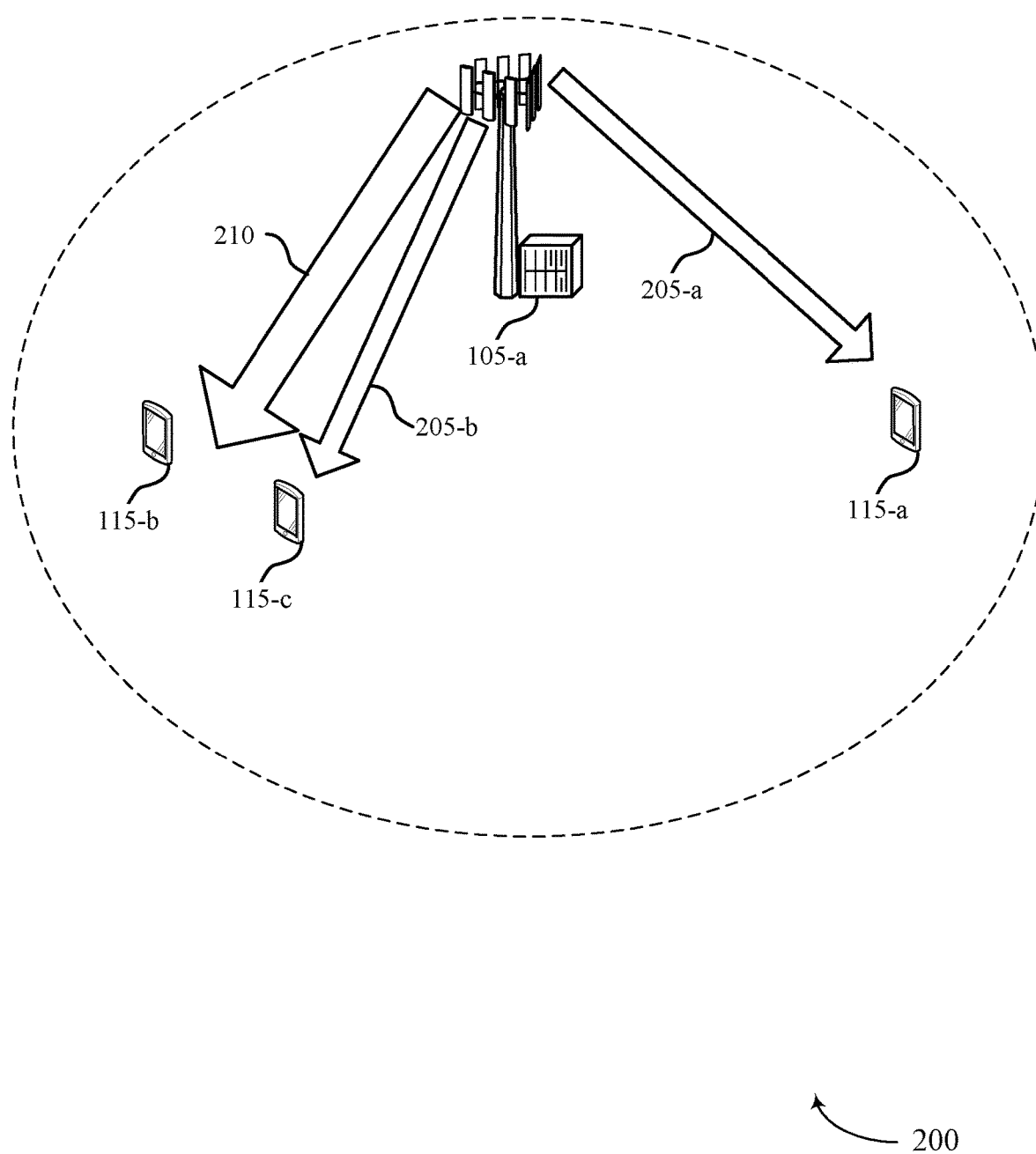
FIG. 2 illustrates an example of a wireless communications system that supports processing for multicast operation using multiple sets of processing resources in accordance with aspects of the present disclosure.

FIG. 2 illustrates an example of a wireless communications system 200 that supports processing for multicast operation using multiple sets of processing resources in accordance with aspects of the present disclosure. In some examples, wireless communications system 200 may implement aspects of wireless communications system 100. Wireless communications system 200 may include a base station 105-a and UEs 115 including UE 115-a, UE 115-b, and UE 115-c, which may be examples of corresponding devices described with reference to wireless communications system 100.

In some examples, base station 105-a may communicate with one or more UEs 115. For instance, base station 105-a may transmit unicast message 205-a to UE 115-a. Base station 105-a may schedule unicast message 205-a by transmitting a DCI message with a CRC scrambled with a cell-specific RNTI (C-RNTI) unique to UE 115-a.

In some examples, base station 105-a may transmit a multicast message 210 to multiple UEs 115 (e.g., UE 115-b and UE 115-c). Base station 105-a may transmit multicast message 210 over a single PDSCH received by UE 115-b and UE 115-c simultaneously. Base station 105-a may schedule multicast message 210 via a DCI message with a CRC scrambled by an M-RNTI specific to UEs 115 to which the multicast message 210 is transmitted (e.g., UE 115-b and UE 115-c). In some examples, to improve spectral efficiency, wireless communications system 200 may support ACK or NACK feedback messages to multicast messages 210. That is, both UE 115-b and UE 115-c may transmit a feedback message (e.g., an ACK message, or a NACK message) to base station 105-a indicating reception or failed reception of the multicast message 210. In some examples, UE115-b and UE 115-c may transmit respective feedback messages over a same set of one or more resources designated for multicast feedback signaling. In some examples, UE 115-b may be configured with a first set of one or more resources for multicast feedback signaling, and UE 115-c may be configured with a second set of one or more resources for multicast feedback signaling. In other examples, such feedback messages may not be sent for multicast messages 210.

A UE 115 (e.g., UE 115-c) may support unicast, multicast, and broadcast communications. In an idle or inactive mode, UE 115-c may support reception and processing of broadcast messages (not shown). In a connected mode, UE 115-c may support both unicast and broadcast communications. In some examples, UE 115-c may also support multicast operations, as described herein. For unicast processing and signaling, UE 115-c may operate under one or more constraints or rules. For instance, for multiple HARQ processes (e.g., receiving, processing, and providing feedback), multiple PDSCHs may not overlap with each other in time for a given scheduled cell. Base station 105-a may refrain from retransmitting a PDSCH until the end of a HARQ-ACK feedback resource for the PDSCH having the same HARQ process identifier (ID). For instance, base station 105-a may transmit unicast message 205-b having a first HARQ process ID to UE 115-c, and may wait until the end of a configured HARQ-ACK resource for the HARQ process ID associated with unicast message 205-b before sending a retransmission of unicast message 205-b. For the serving cell associated with base station 105-a, out-of-order HARQ-ACK feedback may not be permitted. For instance, base station 105-a may transmit a first unicast message 205 and a second unicast message 205 to UE 115-c. UE 115-c may not be permitted to transmit a feedback message having a HARQ process ID associated with the second unicast message 205 prior to transmitting a feedback message having a HARQ process ID associated with the first unicast message 205. Additionally, or alternatively, for two HARQ process IDs in the serving cell, out of order downlink scheduling (e.g., between a physical downlink control channel (PDCCH) and its corresponding PDSCH) may not be permitted. Additionally, or alternatively, in a first frequency band (e.g., FR1), a UE 115 may be required to be able to receive time-overlapping unicast messages 205 and multicast messages 210. In a second frequency band (e.g., FR2), a UE 115 may not support simultaneous receptions. In such examples, a UE 115 may prioritize some signaling (e.g., system information triggered by a paging RNTI (P-RNTI) over other signaling.

UE 115-c may have limited processing capabilities, or may be limited by one or more of the constraints described herein. Mitigating, reducing, eliminating, or overcoming such limitations as described herein may in some cases result in increased spectral efficiency, decreased system latency, or other benefits that may be appreciated by one of ordinary skill in the art. For example, base station 105-c may increase spectral efficiency by transmitting a unicast message 205-b to UE 115-c while simultaneously transmitting a multicast message 210 to UE 115-b and UE 115-c. If UE 115-c were constrained from simultaneously receiving PDSCHs simultaneously, the UE 115-c may drop one or both of unicast message 205-b and multicast message 210. Additionally, or alternatively, UE 115-c may have limited capacity to simultaneously process and provide feedback for unicast messages 205 and multicast messages 210. For instance, if UE 115-c were unable to provide out-of-order HARQ feedback for unicast messages 205 and multicast message 210, then UE 115-c may drop one or more unicast messages 205 or multicast message 210, or may fail to provide HARQ feedback. If UE 115-c were to utilize its available processing resources (e.g., a fixed number of HARQ process IDs supported for a given time or for a given CC) to receive only one kind of message (e.g., only unicast messages 205), then wireless communications system 200 may experience decreased spectral efficiency, increased signaling overhead, increased system latency, and decreased user experience.

In some examples, as described herein, a UE 115 (e.g., UE 115-c), may support simultaneous reception of one or more unicast messages 205-b and one or more multicast messages 210 over the same CC by effectively borrowing processing resources, such as from another CC, or another receive chain. For instance, UE 115-c may utilize a first set of processing resources for receiving and processing unicast messages 205, and may utilize a second set of processing resources for receiving and processing multicast messages 210. The first and second sets of processing resources may otherwise (e.g., at other times during the operation of the UE 115) be associated with first and second CCs, or first and second transmit/receive TRPs. UE 115-c may utilize the first set of processing resources and the second set of processing resources to simultaneously receive, process, provide feedback, or a combination thereof, to both unicast messages 205 and multicast messages 210 on the same CC. Such resource borrowing procedures are described in greater detail with reference to FIGS. 2 and 3.

Figure 3:
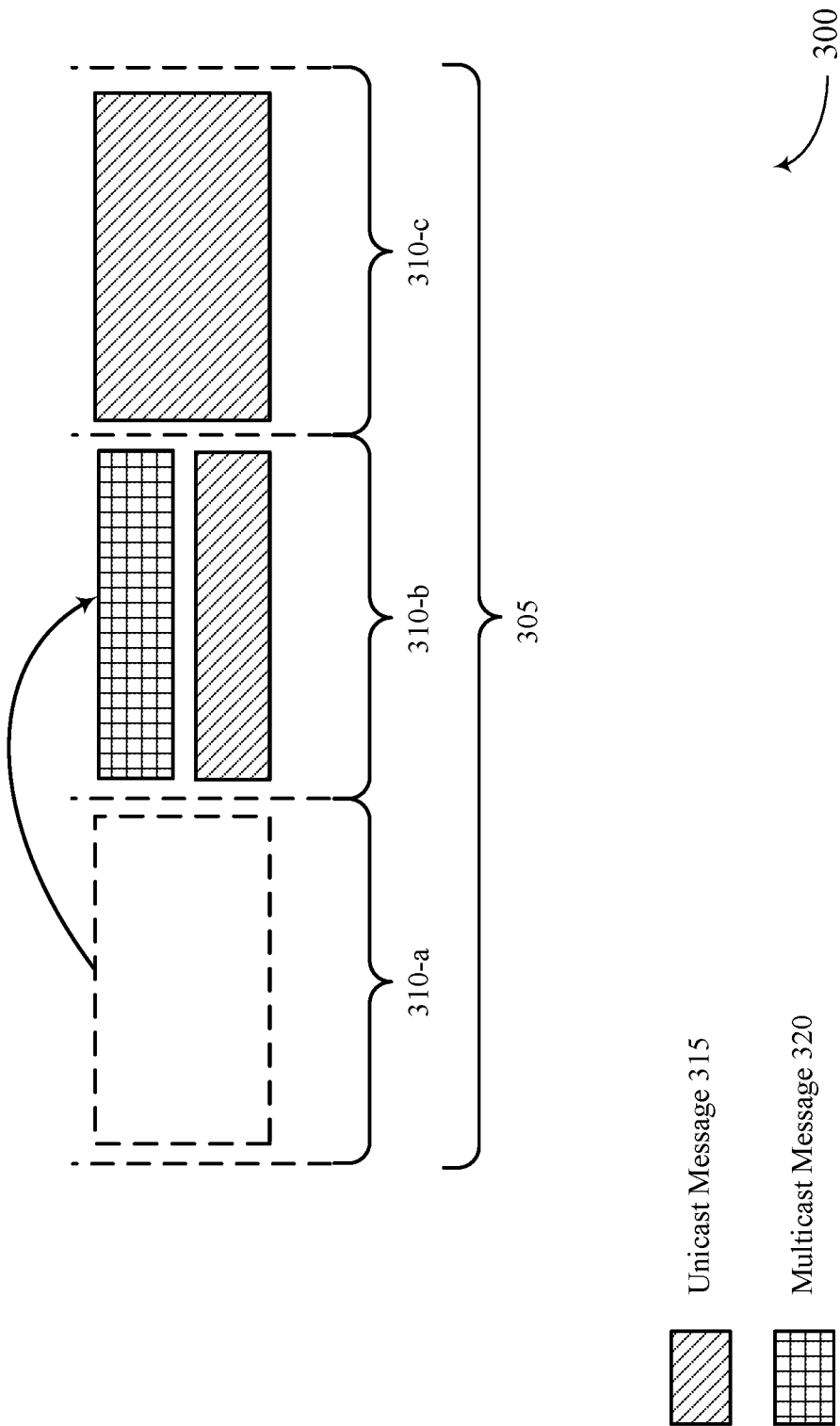
FIG. 3 illustrates an example of a signal processing scheme that supports processing for multicast operation using multiple sets of processing resources in accordance with aspects of the present disclosure.

FIG. 3 illustrates an example of a signal processing scheme 300 that supports processing for multicast operation using multiple sets of processing resources in accordance with aspects of the present disclosure. In some examples, signal processing scheme 300 may implement aspects of wireless communications system 100 or wireless communications system 200.

A UE 115 may utilize its CA capabilities to support simultaneous multicast and unicast operations on a single CC. UE 115 may support intra-band CA. For example, UE 115 may support CA across three CCs (e.g., CC 310-a, CC 310-b, and CC 310-c) of a single band 305. It is to be understood that this and any other specific numeric examples herein are provided solely for illustrative clarity and are not limiting, of the claims or otherwise. When configured in CA with three CCs, UE 115 may receive downlink signals from a base station 105 using processing capabilities associated with each respective CC 310. For instance, UE 115 may utilize multiple sets of processing resources to receive downlink signals, each having a HARQ process ID, process the downlink signals, and provide feedback messages for each HARQ process ID. In some examples, UE 115 may utilize a first set of processing resources for receiving, processing, and providing feedback for unicast messages on CC 310-a, a second set of processing resources for receiving, processing, and providing feedback for unicast messages on CC 310-b, and a third set of processing resources for receiving, processing, and providing feedback for unicast messages on CC 310-c.

In some examples, UE 115 may be configured to receive multicast PDSCHs using a baseband capability of (otherwise associated with, that may otherwise be used for) one of the CCs. That is, if UE 115 is capable of intra-band downlink CA for up to three CCs (e.g., CC 310-a, CC 310-b, and CC 310-c), then UE 115 may also be capable of supporting intra-band downlink CA for two CCs (e.g., CC 310-b and CC 310-c) and simultaneous multicast and unicast processing in one of those two CCs (e.g., CC 310-b). In such examples, UE 115-a may use the processing resources associated with CC 310-b and CC 310-c to receive unicast messages over CC 310-b and CC 310-c in a CA mode. At the same time, UE 115 may use the processing resources associated with CC 310-a to receive one or more multicast messages 320 over CC 310-b. In some examples, UE 115 may disable CC 310-a (e.g., autonomously upon determining to utilize the processing resources associated with CC 310-a for multicast messages 320 received over CC 310-b, or based on a configuration message received from base station 105). In some examples, UE 115 may continue to utilize at least some of the frequency resources of CC 310-*a* for receiving unicast or multicast messages using the processing resources associated with CC 310-*a*, as described in greater detail with reference to FIGS. 7 and 8.

Borrowing processing resources from one CC 310 for use on another CC 310, as described herein, may include dividing a total number of processing resources. That is, a UE 115 that supports CA across three CCs 310 may have a total number of available processing resources (e.g., a total number of HARQ process IDs that can be simultaneously supported, a total number of computational resources, the total number of baseband processing units (e.g., the total number of multiplications, the total number of codewords the UE can decode, the total number of channel state information (CSI) processes the UE can measure and update, the total number of downlink control messages the UE can decode), or the total amount of information the UE can store in the soft buffer for data), or total data rate, within a unit of time (e.g., slot, symbol, or subframe). In such examples, using processing resources associated with CC 310-*a* for receiving multicast messages over CC 310-*b* may simply mean apportioning total available processing resources, and allocating a first portion of total available resources (e.g., one third of total available processing resources) to multicast operations and allocating a second portion of total available resources (e.g., two thirds of total available processing resources) to CA unicast operations across CC 310-*b* and CC 310-*c*.

In some examples, UE 115 may report CA or processing resource capabilities to a base station 105. For example, UE 115 may report its capability to use a subset of its CA capabilities for multicast operations for a given band or band combination. A network device (e.g., a base station 105) may utilize the reported capability information to determine what CA configurations, including multicast operations on one CC of a CA, are supported by the UE 115. In some examples, UE 115 may support a data rate calculated as follows: data rate $$(\text{in } Mbps) = 10^{-6} \cdot \sum_{j=1}^{J} \left( v_{Layers}^{(j)} \cdot Q_m^{(j)} \cdot f^{(j)} \cdot R_{max} \frac{N_{PRB}^{BW(j),\mu} \cdot 12}{T_s^{\mu}} (1 - OH^{(j)}) \right)$$

where f is a scaling factor that directly affects the data rate. The scaling factor f may be band specific. Thus, in some examples, UE 115 may include the value of f in its report. The capability report may include multiple capabilities for achieving a data rate for various configurations. For example, the capability report may include a first capability for intra-band CA with three CCs 310, and a second capability report for intra-band CA for two CCs 310 and simultaneous unicast and multicast operations on one CC using the capability of one CC in the same band 305.

Figure 4:
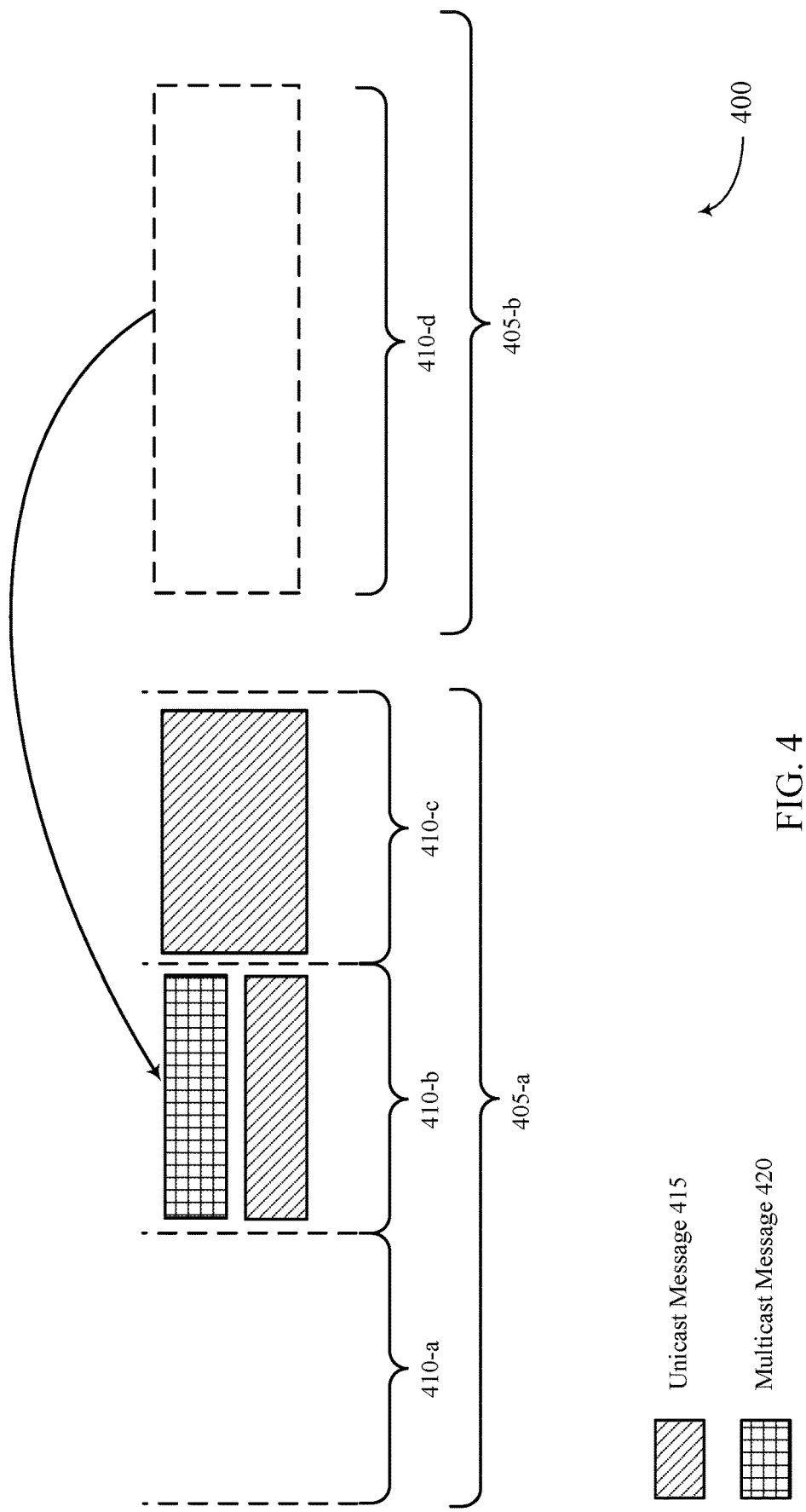
FIG. 4 illustrates an example of a signal processing scheme that supports processing for multicast operation using multiple sets of processing resources in accordance with aspects of the present disclosure.

FIG. 4 illustrates an example of a signal processing scheme 400 that supports processing for multicast operation using multiple sets of processing resources in accordance with aspects of the present disclosure. In some examples, signal processing scheme 400 may implement aspects of wireless communications system 100 or wireless communications system 200.

A UE 115 may utilize its CA capabilities to support simultaneous multicast and unicast operations on a single CC of a particular band. UE 115 may support intra-band CA or inter-band CA. For example, UE 115 may support CA across three CCs (e.g., CC 410-*a*, CC 410-*b*, and CC 410-*c*) of a single band 405-*a*. When configured in CA with three CCs, UE 115 may receive downlink signals from a base station 105 using processing capabilities associated with each respective CC 410. For instance, UE 115 may utilize multiple sets of processing resources to receive downlink signals, each having a HARQ process ID, process the downlink signals, and provide feedback messages for each HARQ process ID. In some examples, UE 115 may utilize a first set of processing resources for receiving, processing, and providing feedback for unicast messages on CC 410-*a*, a second set of processing resources for receiving, processing, and providing feedback for unicast messages on CC 410-*b*, and a third set of processing resources for receiving, processing, and providing feedback for unicast messages on CC 410-*c*.

In some examples, UE 115 may be configured to receive multicast PDSCHs using a baseband capability of CCs 410 of another band 405-*b*. That is, if UE 115 is capable of intra-band downlink CA for up to three CCs (e.g., CC 410-*a*, CC 410-*b*, and CC 410-*c*), then UE 115 may also be capable of supporting intra-band downlink CA for two CCs (e.g., CC 410-*b* and CC 410-*c*) and simultaneous multicast and unicast processing in a single CC (e.g., CC 410-*b*). In such examples, UE 115-*a* may use the processing resources associated with CC 410-*b* and CC 410-*c* to receive unicast messages over CC 410-*b* and CC 410-*c* in a CA mode. At the same time, UE 115 may use the processing resources associated with band 405-*b* (e.g., a CC 410-*d* of band 405-*b*) to receive one or more multicast messages 420 over CC 410-*b*. In some examples, UE 115 may disable CC 410-*a* (e.g., autonomously upon determining to utilize the processing resources associated with CC 410-*a* for multicast messages 420 received over CC 410-*b*, or based on a configuration message received from base station 105). In some examples, UE 115 may continue to utilize at least some of the frequency resources of CC 410-*a* for receiving unicast or multicast messages using the processing resources associated with CC 410-*a*, as described in greater detail with reference to FIGS. 7 and 8.

In some examples, UE 115 may report CA or processing resource capabilities to a base station 105. For example, UE 115 may report its capability to use a subset of its CA capabilities for multicast operations for a given band or band combination. A network device (e.g., a base station 105) may utilize the reported capability information to determine what CA configurations, including multicast operations on one CC of a CA, are supported by the UE 115. In some examples, UE 115 may support a data rate calculated as follows: data rate $$(\text{in } Mbps) = 10^{-6} \cdot \sum_{j=1}^{J} \left( v_{Layers}^{(j)} \cdot Q_m^{(j)} \cdot f^{(j)} \cdot R_{max} \frac{N_{PRB}^{BW(j),\mu} \cdot 12}{T_s^{\mu}} (1 - OH^{(j)}) \right)$$

where f is a scaling factor that directly affects the data rate. The scaling factor f may be band specific. Thus, in some examples, UE 115 may include the value of f in its report. The capability report may include multiple capabilities for achieving a data rate for various configurations. For example, the capability report may include a first capability for intra-band CA with three CCs 410, and a second capability report for intra-band CA for two CCs 410 and simultaneous unicast and multicast operations on one CC using the capability of one CC in the same band 405. For example, the UE reports the capability report including the value of f when the UE is configured with intra-band CA with two CCs where unicast and multicast is operated in one of the CC, in addition to the capability report including the values off (one value for one band, and the other value for the other band) when the UE is configured with inter-band CA with three CCs.

Figure 5:
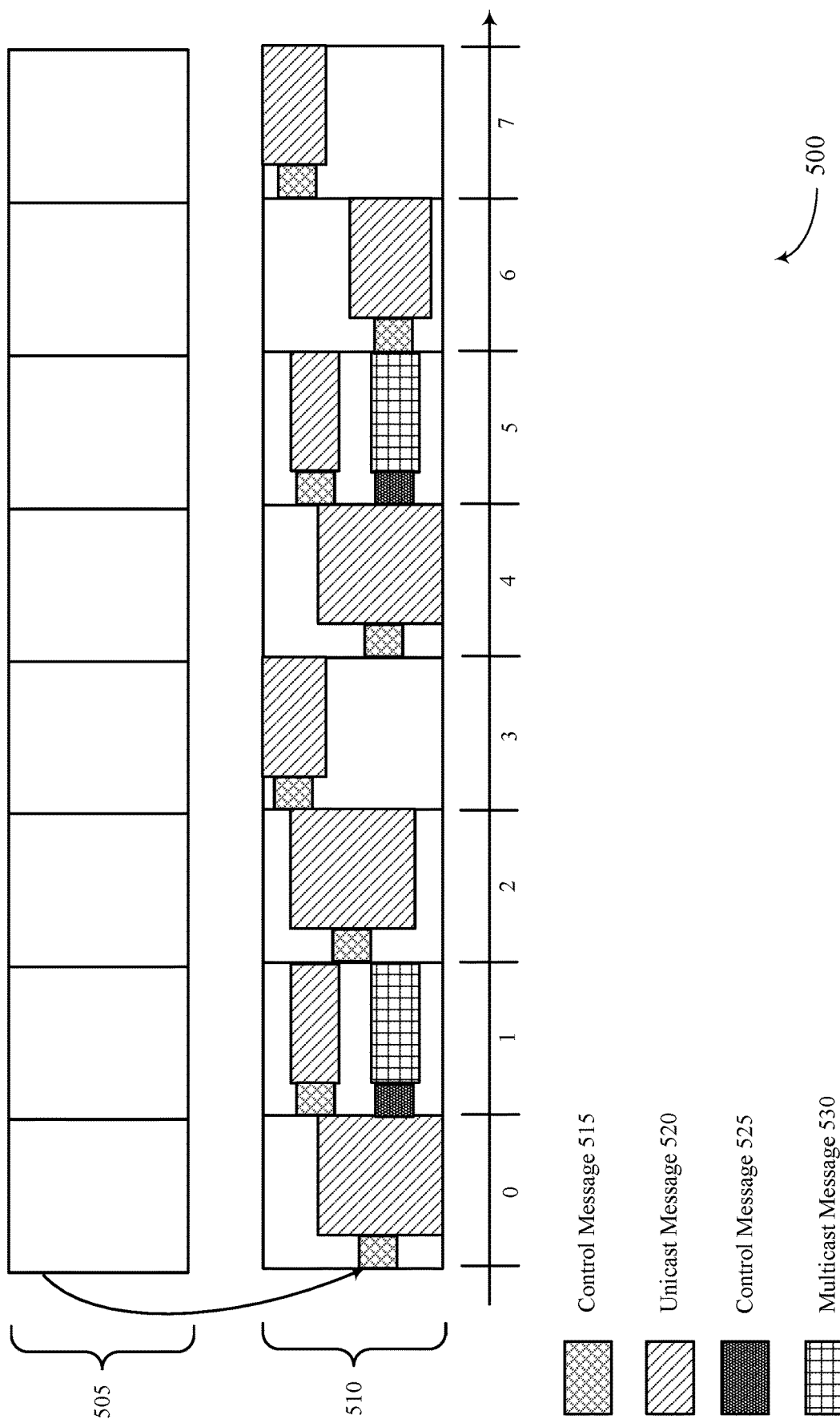
FIG. 5 illustrates an example of a signal processing scheme that supports processing for multicast operation using multiple sets of processing resources in accordance with aspects of the present disclosure.

FIG. 5 illustrates an example of a signal processing scheme 500 that supports processing for multicast operation using multiple sets of processing resources in accordance with aspects of the present disclosure. In some examples, signal processing scheme 500 may implement aspects of wireless communications system 100 or wireless communications system 200.

In some examples, a UE 115 may simultaneously perform multicast and unicast operations on a single CC. That is, UE 115 may utilize soft-buffer or HARQ feedback resources using the baseband capability of CC 505 to receive and process multicast messages 530 over CC 510.

UE 115 may support CA across multiple CCs, including CC 505 and CC 510. UE 115 may be capable of supporting CA downlink unicast signaling using a first set of processing resources for CC 505 and a second set of processing resources for CC 510.

UE 115 may support simultaneous multicast and unicast reception by using the first set of processing resources for receiving and processing multicast messages 530 over CC 510. UE 115 may simultaneously use the second set of processing resources for receiving and processing unicast messages 520. By using the first set of resources and the second set of resources as described herein, UE 115 may simultaneously receive up to two PDSCHs (e.g., a unicast message 520 over a first PDSCH and a multicast message 530 over a second PDSCH).

In a first TTI (e.g., slot 0), UE 115 may receive a control message 515 (e.g., a DCI in a PDCCH) including a grant of resources for receiving a unicast message 520 (e.g., over a PDSCH). UE 115 may utilize the second set of processing resources for receiving control message 515 and unicast message 520. In a second TTI (e.g., slot 1), UE 115 may similarly receive a control message 515 including a grant of resources for receiving another unicast message 520. UE 115 may simultaneously receive a control message 525 (e.g., a DCI in a PDCCH) including a grant of resources for a multicast message 530 (e.g., over a PDSCH). UE 115 may utilize the first set of processing resources for receiving control message 525 and multicast message 530. Thus, across multiple slots (e.g., slots 3 through slot 7), UE 115 may sometimes receive only unicast messages 520 using the second set of processing resources, and may sometimes simultaneously receive a unicast message 520 using the second set of processing resources and a multicast message 530 using the first set of processing resources.

Base station 105 may configure downlink signaling according to the capability report received from the UE 115 (e.g., as described with reference to FIGS. 3 and 4). For example, base station 105 may schedule unicast messages 520, or simultaneous unicast messages 520 and multicast messages 530 based on the reported capability of the UE to support such signaling. Additionally, or alternatively, base station 105 may refrain from scheduling simultaneous signaling that would exceed a UE capability of data rate for CC 510. That is, the sum of a data rate for a multicast message 530 and a data rate for a unicast message 520 may exceed a per-carrier data rate, but may not exceed a total data rate, as indicated by the UE capability report. Per-CC and total data rate limitations are described in greater detail with reference to FIG. 6. In some examples, UE 115 may perform processing for multiple HARQ process IDs, as described in greater detail with reference to FIG. 6.

Figure 6:
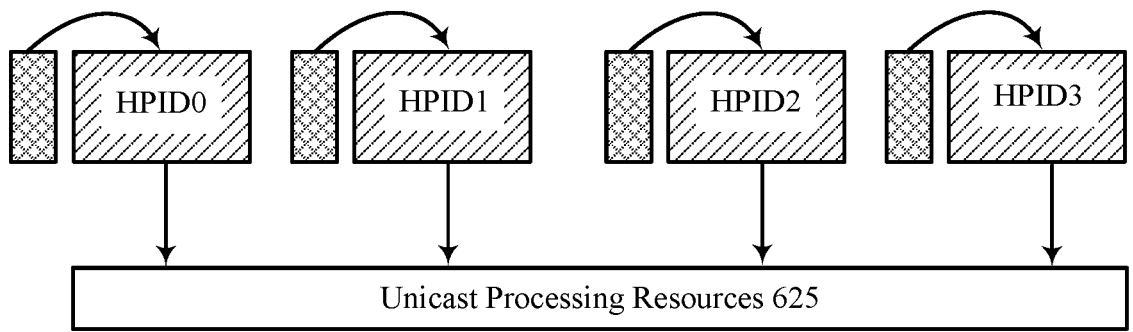
FIG. 6 illustrates an example of a signal processing scheme that supports processing for multicast operation using multiple sets of processing resources in accordance with aspects of the present disclosure.
Figure 6:
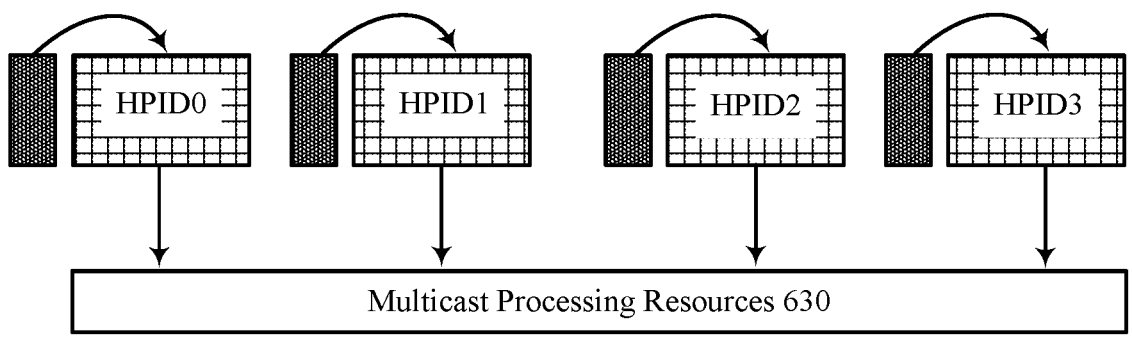

FIG. 6 illustrates an example of a signal processing scheme 600 that supports processing for multicast operation using multiple sets of processing resources in accordance with aspects of the present disclosure. In some examples, signal processing scheme 600 may implement aspects of wireless communications system 100 or wireless communications system 200.

In some examples, as described in greater detail with reference to FIGS. 3 through 5, a UE 115 may borrow processing capabilities from one CC to perform multicast processing on another CC. For example, multicast processing resources 630 may be HARQ soft-buffer management resources previously used for unicast operations on another CC. On another CC, UE 115 may perform unicast operations using unicast processing resources 625, and may simultaneously perform multicast operations using multicast processing resources 630. Processing resources (e.g., unicast processing resources 625 and multicast processing resources 630) may be referred to as HARQ processing resources, HARQ process ID processing resources, soft buffers or soft buffer management resources, HARQ soft buffers or soft buffer management resources. A soft buffer management resource or process, HARQ or otherwise, may in some cases correspond to a respective soft buffer.

UE 115 may receive a control message 605 including a grant for a PDSCH carrying a first unicast message 610 with a first HARQ Process ID (HPID) (e.g., HPID0). Similarly, UE 115 may receive subsequent PDCCHs (e.g., control messages 605) including grants for second, third and fourth PDSCHs carrying unicast messages 610 with respective HARQ process IDs HPID1, HPID2, and HPID3. Similarly, UE 115 may receive control messages 615 including grants for multicast messages 620 having respective HARQ processing IDs HPID0, HPID1, HPID2, and HPID3. For n unicast PDSCHs, UE 115 may maintain up to n−1 HARQ processes. That is, for each of multicast operations and unicast operations, UE 115 may receive, process, and provide feedback for up to n−1 processes. In some examples, the total number of HARQ processes UE 115 can handle between multicast operations and unicast operations may be equal to the sum of a total number of HARQ processes supported by the first CC and the second CC. In some examples, the total number of HARQ processes UE 115 can handle between multicast and unicast operations may be equal to the total number of HARQ processes supported only by the second CC on which both multicast and unicast operations are performed.

In some examples, UE 115 may manage multiple HPIDs for unicast operations and multiple HPIDs for multicast operations according to one or more rules or constraints. For example, UE 115 may be capable of receiving a unicast message 610 simultaneously with a multicast message 620 over the same CC. Thus, such unicast messages 610 and multicast messages 620 may at least partially overlap in time. UE 115 may not support out-of-order feedback signaling for unicast operations, or out-of-order feedback signaling for multicast operations. That is, UE 115 may refrain from transmitting feedback for unicast message 610 with HPID prior to transmitting feedback for unicast message 610 with HPID 0. However, UE 115 may support out-of-order feedback between multicast and unicast signaling. For instance, UE 115 may receive unicast message 610 with HPID0 prior to receiving multicast message 620 with HPID1. However, UE 115 may transmit a feedback message (e.g., an ACK message or a NACK message) for the multicast message 620 with HPID prior to transmitting a feedback message for unicast message 610 with HPID 0.

In some examples, base station 105 may not support retransmissions prior to receiving feedback for a particular transmission. For example, base station 105 may refrain from sending a retransmission of a unicast message 610 with a HPID until it receives a feedback message corresponding to that HPID. However, out-of-order retransmission between multicast and unicast operations may be permitted. For instance, UE 115 may receive unicast message 610 with HPID0 prior to received multicast message 620 with HPID1. But, base station 105 may send a retransmission of the multicast message 620 with HPID (e.g., after receiving a NACK message from UE 115 for the multicast message 620 with HPID1) prior to transmitting a retransmission of unicast message 610 with HPID0 (e.g., after receiving a NACK message form UE 115 for unicast message 610 with PHID0).

In some examples, out-of-order downlink scheduling may not be supported for unicast operations or multicast operations, but out-of-order downlink scheduling between multicast and unicast operations may be permitted. That is, for unicast operations, UE 115 may not schedule unicast message 610 with a control message 605 received prior to unicast message 610 with HPID0. However, UE 115 may receive a control message 615 scheduling multicast message 620 with HPID prior to receiving a control message 605 scheduling unicast message 610 with HPID0.

Thus, UE 115 may simultaneously support unicast operations using unicast processing resources 625 and multicast operations using multicast processing resources 630. Each of unicast processing resources 625 and multicast processing resources 630 may support multiple HARQ processes according to the rules described herein. Multicast processing resources 630 may be associated with a first CC that was previously utilized for CA unicast operations. Unicast processing resources 625 may be associated with a second CC on which both unicast and multicast operations are supported.

In some examples, UE 115 may be capable of processing downlink signaling from multiple TRPs simultaneously. In such examples, UE 115 may utilize processing resources associated with a first TRP for unicast operation, and processing resources associated with a second TRP for multicast operations. In such examples, multicast processing resources 630 may be associated with a first TRP, or a first receive chain associated with a first TRP, and unicast processing resources 625 may be associated with a second TRP, or a second receive chain associated with a second TRP. UE 115 may be configured, by base station 105, with two different control resource sets (CORESETs), with different values of CORESETPoolIndex. At least one of the two CORESETs may be used for unicast operations and at least one CORESET may be used for multicast operations. Based on the coreset where UE 115 detects a scheduling DCI, UE 115 may determine whether the DCI schedules PDSCH for unicast messages 610 or multicast messages 620. Constraints or rules for simultaneously using unicast processing resources 625 and multicast processing resources 630 are described herein with reference to FIG. 6.

Figure 7:
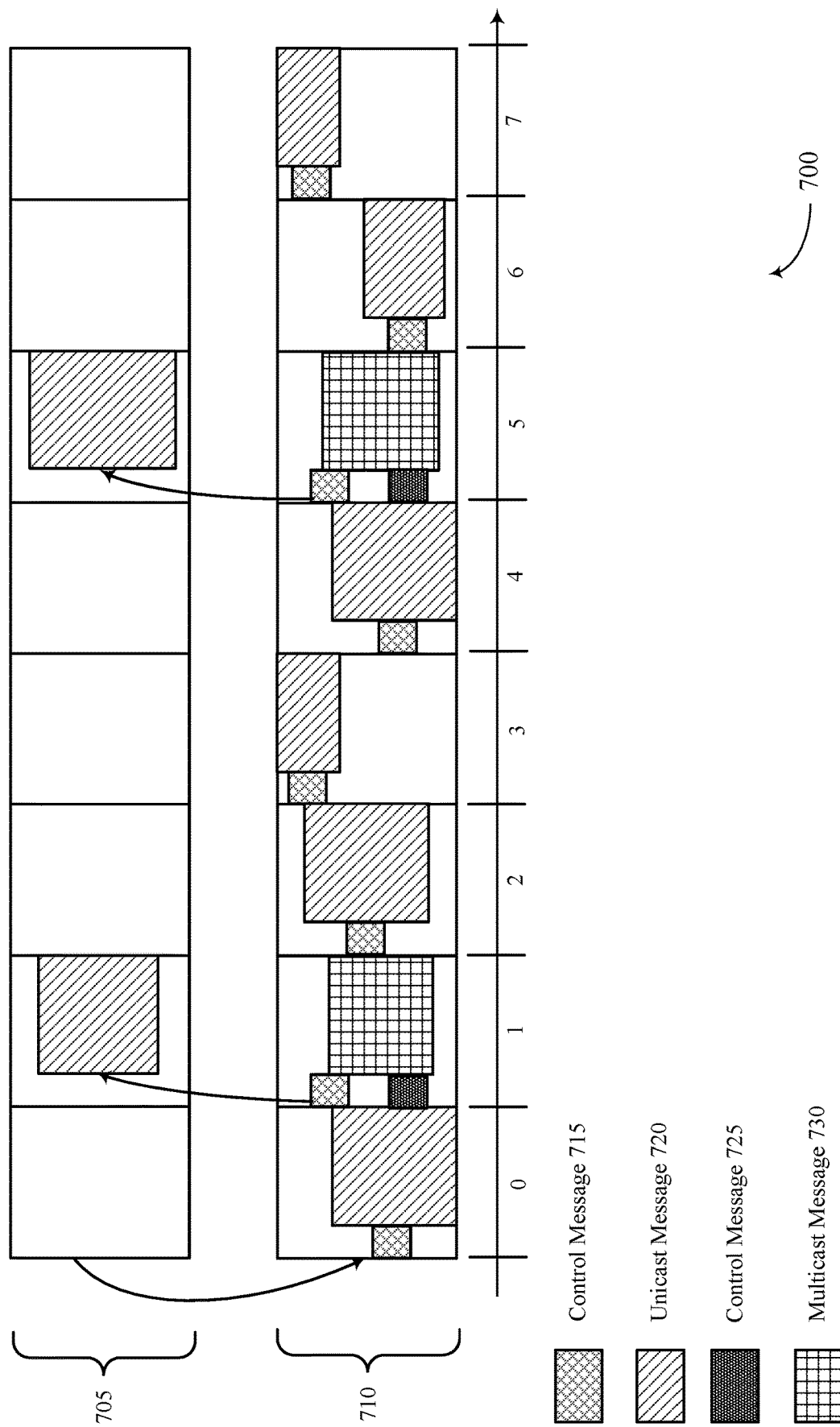
FIG. 7 illustrates an example of a signal processing scheme that supports processing for multicast operation using multiple sets of processing resources in accordance with aspects of the present disclosure.

FIG. 7 illustrates an example of a signal processing scheme 700 that supports processing for multicast operation using multiple sets of processing resources in accordance with aspects of the present disclosure. In some examples, signal processing scheme 700 may implement aspects of wireless communications system 100 or wireless communications system 200.

In some examples, by multiplexing both unicast and multicast signaling onto a single CC as described herein, a UE 115 may not be able to utilize its full capability. For example, if UE 115 disables a first CC to utilize the processing resources of that CC for multicast signaling, then the UE 115 may only receive downlink signaling over a portion (e.g., two thirds for a three CC CA of a band) of its total available bandwidth. Additionally, or alternatively, instead of receiving unicast messages that span all or a large portion of available frequency resources of a CC, when multiplexing unicast and multicast signaling, UE 115 may only receive multicast and unicast signals that span half or less of the available frequency resources of the CC. In such examples, although a UE may achieve a peak data rate with multiple CCs, a UE may not be able to achieve such a peak data rate using less than the total number of available CCs. Additionally, or alternatively, when receiving both unicast and multicast signaling on a same CC, with limited frequency resources available, neither multicast operations nor unicast operations will achieve peak data rates on the same CC.

In some examples, to increase data rates, improve efficiencies, and increase throughput, UE 115 may receive both multicast and unicast signaling on a single CC (e.g., CC 710), but may also utilize other CCs for unicast or multicast signaling. This may be accomplished using cross-carrier scheduling, as illustrated and described with reference to FIG. 7, or using self-carrier scheduling, as illustrated and described with reference to FIG. 8.

As described herein, UE 115 may utilize a first set of processing resources associated with CC 710 to receive unicast messages 720. UE 115 may be capable of using a second set of processing resources associated with CC 705 for receiving unicast messages 720 over CC 710. UE 115 may borrow the second set of processing resources to perform multicast operations on CC 710. Thus, on CC 710, UE 115 may support both unicast and multicast operations. However, in some examples, UE 115 may also be capable of receiving some of the signaling on CC 705. Thus, a first set of processing resources may be used for receiving unicast messages 720, and a second set of processing resources may be used for receiving multicast messages 730.

In some examples, in a first TTI (e.g., slot 0) on CC 710, UE 115 may receive a control message 715 (e.g., a DCI), including a grant of resources on a PDSCH for a unicast message 720 on CC 710. UE 115 may use the first set of processing resources to receive and process the control message 715 and the unicast message 720 on CC 710. In a second TTI (e.g., slot 1) UE 115 may use the first set of processing resources to receive another control message 715 on CC 710. The control message 715 (e.g., a DCI) may include a grant of resources for a PDSCH carrying a unicast message 720 during slot 1 on CC 705. UE 115 may use the first set of processing resources to receive both the control message 715 on CC 710 and the unicast message 720 on CC 705. UE 115 may receive a control message 725 simultaneously with the control message 715 in slot 1. UE 115 may receive the control message 715 using the first set of processing resources and the control message 725 using the second set of processing resources. UE 115 may similarly use the first set of processing resources to receive the unicast message 720 on CC 705 and may use the second set of processing resources to receive the multicast message 730 on CC 710.

Offloading some unicast or multicast signaling onto CC 705 (e.g., instead of disabling CC 705) may allow UE 115 to improve throughput and increase data rates. For example, in slot 1 or slot 5, UE 115 may be able to receive a unicast message 720 that spans more than half of the available frequency resources of CC 710, and simultaneously receive a multicast message 730 that spans more than half of the available frequency resources of CC 705. Such large messages may not be possible when multiplexing the multicast message 730 and the unicast message 720 into a single CC, as described with reference to FIG. 5. UE 115 may support cross-carrier scheduling for multicast messages 730, unicast messages 720, or both. In some examples, UE 115 may support three parallel HARQ or soft buffer management processes (e.g., instead of two, as illustrated with reference to FIG. 6), as a HARQ or soft buffer management process may not be shared across CCs 705 and 710. That is, UE 115 may support a HARQ soft buffer management process for unicast messages 720 on CC 710, a HARQ soft buffer management process for multicast messages 730 on CC 710, and a third HARQ soft buffer management process for unicast or multicast signaling on CC 705. In such examples, in slot 1, UE 115 may receive the control message 715 and the unicast message 720 on CC 710 using a first set of processing resources. Then, during slot 1, UE 115 may receive the control message 725 and the multicast message 730 on CC 710 using a second set of resources and may receive the control message 715 on CC 710 and the unicast message 720 on CC 705 using a third set of processing resources. Additionally or alternatively, in slot 1, UE 115 may receive the control message 715 on CC 710 using a first set of processing resources, the control message 725 and the multicast message 730 on CC 710 using a second set of processing resources, and the unicast message 720 on CC 705 using a third set of processing resources. In some examples, one set of processing resources may be divided between CCs. That is, a single set of processing resources may be designated for unicast operations or multicast operations. However, the set of processing resources may be divided in two such that some of the set of processing resources are reserved for processing signaling on CC 705 and some of the set of processing recourses are reserved for processing signaling on CC 710.

Schemes described herein may be performed using self-carrier scheduling, as described in greater detail with reference to FIG. 8.

Figure 8:
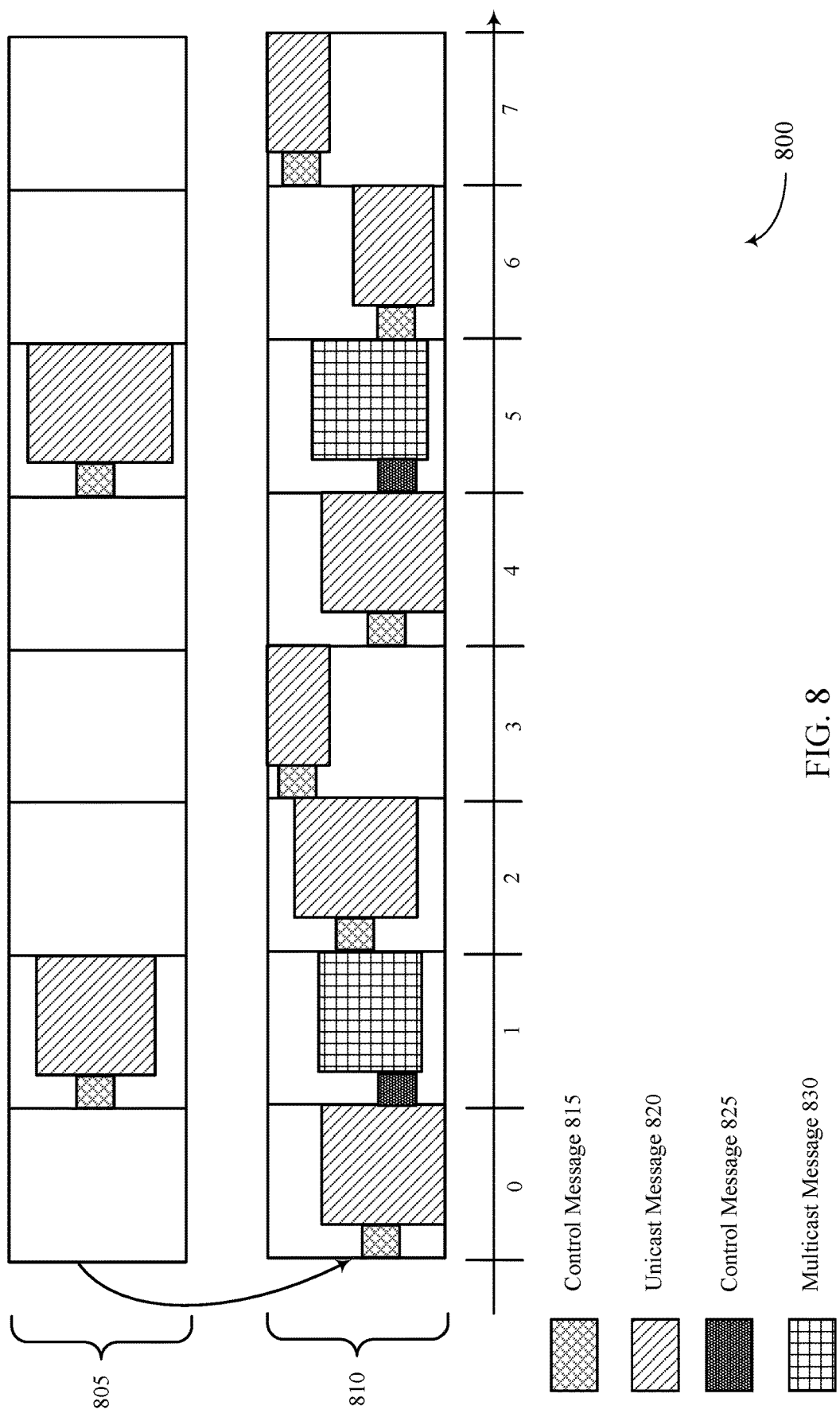
FIG. 8 illustrates an example of a signal processing scheme that supports processing for multicast operation using multiple sets of processing resources in accordance with aspects of the present disclosure.

FIG. 8 illustrates an example of a signal processing scheme 800 that supports processing for multicast operation using multiple sets of processing resources in accordance with aspects of the present disclosure. In some examples, signal processing scheme 800 may implement aspects of wireless communications system 100.

In some examples, a UE 115 may use a first set of processing resources for receiving unicast messages 820 on CC 810, and may use a second set of processing resources for receiving multicast messages 830 on CC 810. In some examples, as described with reference to FIG. 7, UE 115 may improve data rates and throughputs by also receiving multicast or unicast signaling on CC 805. UE 115 may receive such signaling using a self-carrier scheduling.

For example, during a first TTI (e.g., slot 0), UE 115 may receive a control message 815 and a corresponding unicast message 820 on CC 810 using the first set of processing resources. During a second TTI (e.g., slot 1), UE 115 may use a second set of processing resources to receive control message 825 and multicast message 830 on CC 810. Simultaneously, during slot 1, UE 115 may also receive a control message 815 and corresponding unicast message 820 on CC 805. UE 115 may receive the control message 815 and unicast message 820 on CC 805 using a third set of processing resources, the first set of processing resources, or a subset of the first set of processing resources. For example, UE 115 may utilize three parallel HARQ soft buffer management processes if UE 115 cannot support a single HARQ soft buffer management process across CC 805 and CC 810.

Figure 9:
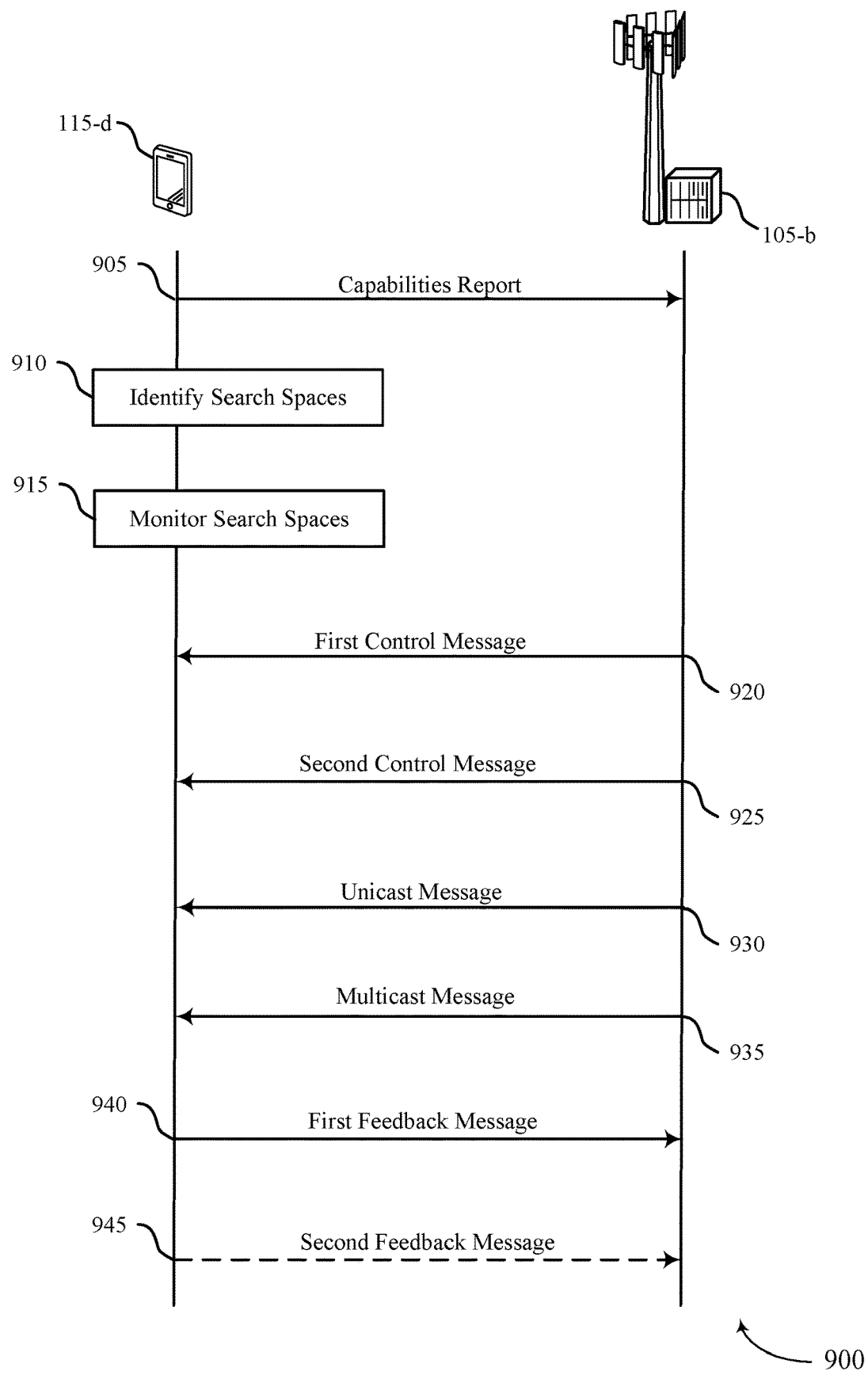
FIG. 9 illustrates an example of a process flow that supports processing for multicast operation using multiple sets of processing resources in accordance with aspects of the present disclosure.

FIG. 9 illustrates an example of a process flow 900 that supports processing for multicast operation using multiple sets of processing resources in accordance with aspects of the present disclosure. In some examples, process flow 900 may implement aspects of wireless communications system 100 or wireless communications system 200. Process flow 900 may include a base station 105-b and a UE 115-d, which may be examples of corresponding devices described with reference to wireless communications systems 100 and 200.

At 905, UE 115-d may transmit, and base station 105-b may receive, a capabilities report. The capabilities report may include an indication of the first set of processing resources and the second set of processing resources. For example, as described with reference to FIG. 3, the capabilities report may include a CA capability (e.g., a CA capability across three CCs), an adjusted capability (e.g., a CA capability for unicast signaling across two CCs and a capability for multicast signaling using processing resources previously associated with another CC). The capability report may further include one or more scaling factor values. The scaling factor may be band specific. Thus, for intra-band CA, UE 115-d may include the value off in its report for the band of the intra-band CA. In some examples, UE 115-d may borrow processing resources from another band. In such examples, the capabilities report may include a scaling factorffor two bands. The capability report may include multiple capabilities for achieving a data rate for various configurations.

At 910, UE 115-d may identify one or more search spaces. Base station 105-b may configure UE 115-d with one or more search spaces. In some examples (e.g., based on the configuration information), UE 115-d may identify a first set of search spaces for unicast PDCCHs and a second set of search spaces for multicast PDCCHs. In some examples, UE 115 may also identify a first set of one or more CORESETs for unicast signaling and a second set of one or more CORESETs for multicast signaling. The unicast CORESETs may be associated with UE-specific signaling and the multicast CORESETs may be associated with group-common signaling.

At 915, UE 115-d may monitor the search spaces identified at 910. For instance, UE 115-d may monitor the first set of search spaces to receive control signaling at 920 for unicast signaling, and may monitor the second set of search spaces to receive control signaling at 925 for multicast signaling. UE 115-d may perform one or more blind decoding procedures on the identified search spaces.

In some examples, UE 115-d may be capable of performing a total number of blind decoding procedures, or may be capable of monitoring for control signaling over a total number of control channel elements (CCEs). UE 115-d may be able to support a first number of blind decoding procedures for a first CC, and a second number of blind decoding procedures for a second CC. In some cases, UE 115-d may use a first set of processing resources and a second set of processing resources on the first CC to simultaneously support both unicast and multicast operations. In such examples, UE 115-d may be able to perform a total number of blind decoding procedures on the first CC. In some examples, the total number of blind decoding procedures may be less than or equal to the sum of the first number of blind decoding procedures permitted on the first CC and the second number of blind decoding procedures permitted on the second CC. Thus, the total number of blind decoding procedures may be greater than the second number of blind decoding procedures permitted on the second CC. In some examples, UE 115-*d* may support a total number of blind decoding procedures that is less than or equal to the second number of blind decoding procedures permitted on the first CC. That is, UE 115-*d* may perform blind decoding for multicast operations and blind decoding for unicast operations, up to a total number of blind decoding procedures that is equal to the number of blind decoding procedures permitted on the first CC.

In some examples, UE 115-*d* may prioritize some PDCCH candidates (e.g., some identified search spaces) over other search spaces when performing a permitted total number of blind decoding procedures. For example, UE 115-*d* may be able to perform a total number of blind decoding procedures equal to the number of blind decoding procedures permitted on the first CC, or may be able to perform a total number of blind decoding procedures that is greater than the number of blind decoding procedures permitted on the first CC. In either case, the total number of blind decoding procedures that UE 115-*d* is capable of supporting (e.g., for multicast and unicast procedures on the same CC) may be less than the number of blind decoding procedures that could be performed on the identified search spaces. In such examples, UE 115-*d* may prioritize some search spaces over other search spaces. In some examples, UE 115-*d* may prioritize PDCCH candidates associated with multicast operations, and may drop PDCCH candidates associated with unicast operations. In some examples, UE 115-*d* may prioritize PDCCH candidates associated with unicast operations, and may drop PDCCH candidates associated with multicast operations. In some examples, UE 115-*d* may dynamically or autonomously determine whether to prioritize multicast or unicast PDCCH candidates. In some examples, base station 105-*b* may transmit a prioritizing message, which may indicate which of unicast or multicast PDCCH candidates to prioritize.

When prioritizing multicast or unicast PDCCH candidates, UE 115-*d* may refrain from performing some blind decoding procedures. In some examples, UE 115-*d* may drop all search spaces associated with unicast or multicast operations. For instance, if UE 115-*d* determines to prioritize multicast PDCCH candidates, UE 115-*d* may only perform blind decoding procedures in search spaces associated with multicast PDCCH candidates. In some examples, UE 115-*d* may drop a portion of search spaces associated with unicast or multicast operations based on periodization. For example, if UE 115-*d* determines to prioritize multicast PDCCH candidates, UE 115-*d* may perform its total number of permitted blind decoding procedures. However, UE 115-*d* may perform all blind decoding procedures on search spaces associated with multicast operations first. Then, UE 115-*d* may perform a number of blind decoding procedures that remain within the total number of permitted blind decoding procedures on search candidates associated with unicast operations. Upon reaching the total number of blind decoding procedures permitted for UE 115-*d* on the CC, UE 115-*d* may refrain from performing additional blind decoding procedures, even if there are additional search spaces associated with unicast operations on the CC.

At 920, base station 105-*b* may transmit, and UE 115-*d* may receive, a first control message. The first control message may be a DCI message, which may include a grant of resources on a PDSCH for the unicast message to be received at 930. UE 115-*d* may receive the first control message using a first set of processing resources. The first set of processing resources may be associated with a first HARQ process or set of HARQ processes or a first HARQ soft buffer management process, may be associated with a first CC, or may be associated with a first TRP.

At 925, base station 105-*b* may transmit, and UE 115-*d* may receive, a second control message. The second control message may be a DCI message, which may include a grant of resources on a PDSCH for the multicast message to be received at 930. UE 115-*d* may receive the second control message using a second set of processing resources. The second set of processing resources may be associated with a second HARQ process or set of HARQ processes or a second HARQ soft buffer management process, may be associated with a second CC, or may be associated with a second TRP. UE 115-*d* may receive the first control message and the second control message over the same CC (e.g., the first CC), as illustrated with reference to FIGS. 5 and 7. In some examples, UE 115-*d* may receive the first control message over the first CC and the second control message over the second CC, as illustrated with reference to FIG. 8. In some examples, UE 115-*d* may receive the first control message and the second message at the same time, or partially overlapping in time.

UE 115-*d* may receive the first and second control messages by performing blind decoding as described herein. In some examples, UE 115-*d* may perform first and second hash functions, respectively. UE 115-*d* may perform a first hash function when preforming blind decoding procedures on search spaces associated with unicast operations, and a second hash function when performing blind decoding procedures on search spaces associated with multicast operations. The first hash function may utilize a unique UE identifier associated with UE 115-*d*. For instance, UE 115-*d* may perform the first hash function based on a C-RNTI. The second hash function may utilize a group identifier for a group of UEs 115 that includes UE 115-*d*. For instance, UE 115-*d* may perform the second hash function based on an M-RNTI. In some cases, the hash function may be defined as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i.$$

At 930, base station 105-*b* may transmit, and UE 115-*d* may receive, a unicast message. UE 115-*d* may receive the unicast message over the first CC using the first set of processing resources.

At 935, base station 105-*b* may transmit, and UE 115-*d* may receive, a multicast message. UE 115-*d* may receive the multicast message over the first CC using the second set of processing resources. In some examples, as illustrated with reference to FIGS. 7 and 8, UE 115-*d* may receive the unicast message over the first CC and the multicast message over the second CC, or the unicast message over the second CC and the multicast message over the first CC. In some examples, UE 115-*d* may receive the unicast message and the multicast message at the same time or partially overlapping in time.

UE 115-*d* may process the unicast message and the multicast message simultaneously. UE 115-*d* may process the unicast message using the first set of processing resources and the multicast message using the second set of processing resources.

At 940, UE 115-*d* may transmit, and base station 105-*b* may receive, a first feedback message. The feedback message may be an ACK message or a NACK message associated with the HPID of the unicast message.

At 945, UE 115-*d* may transmit, and base station 105-*b* may receive, a second feedback message. The second feedback message may be an ACK message or a NACK message associated with the HPID of the multicast message. UE 115-*d* may transmit the second feedback message over the same resources as other UEs 115, or over different resources configured by base station 105-*b*.

In some examples, UE 115-*d* may not transmit the second feedback message. For instance, base station 105-*b* may configure UE 115-*d* to receive multicast message as described herein, but not to provide feedback information. That is, UE 115-*d* may receive and process the multicast message at 935 based on the second control message received at 925 using the second set of processing resources. However, UE 115-*d* may refrain from providing a second feedback message at 945.

In some examples, UE 115-*d* may receive the unicast message and the multicast message in a different order than the first control message and the second control message. In some examples, UE 115-*d* may transmit the first feedback message and the second feedback message in a different order than the unicast message and the multicast message are received.

Figure 10:
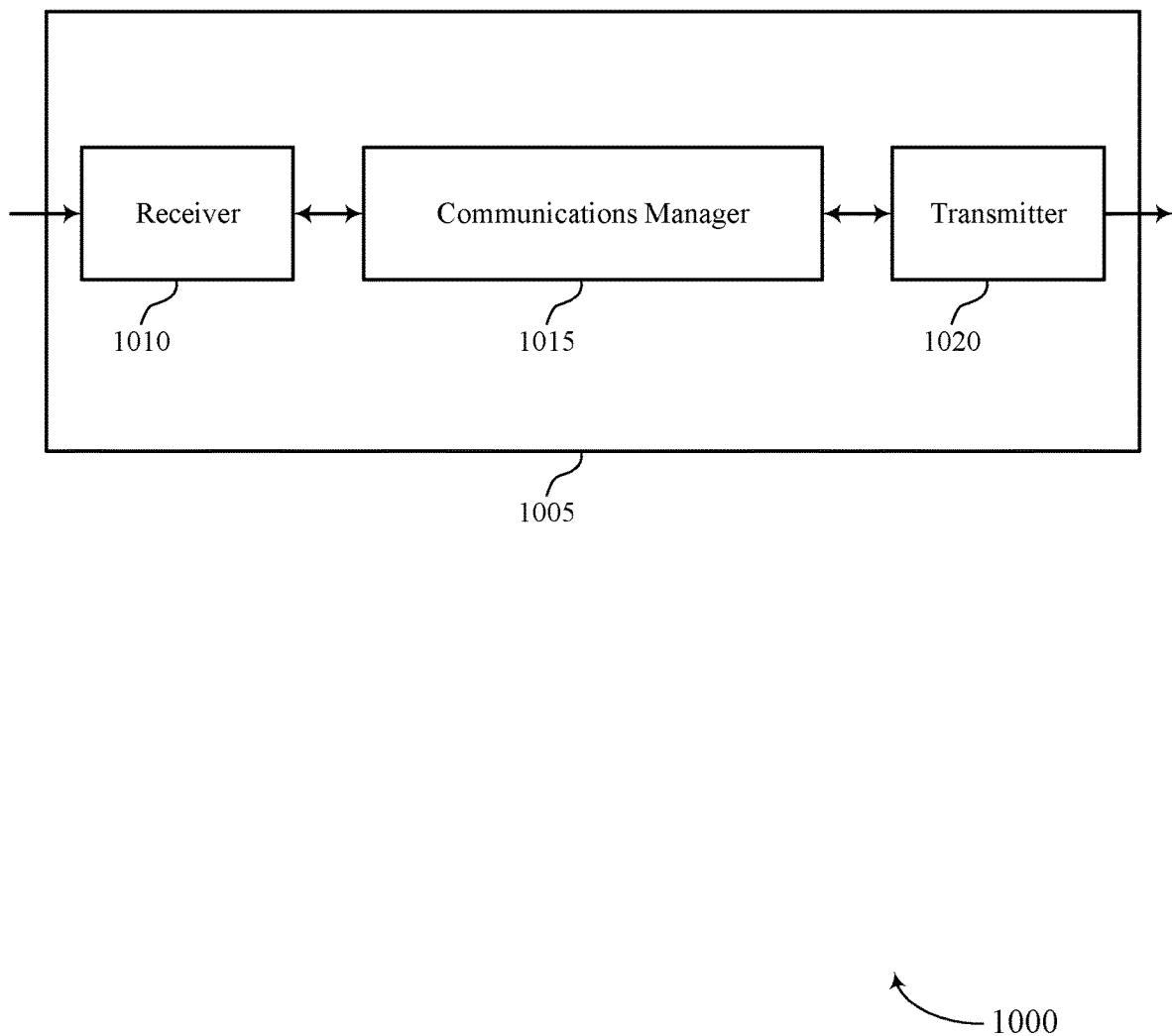
FIGS. 10 and 11 show block diagrams of devices that support processing for multicast operation using multiple sets of processing resources in accordance with aspects of the present disclosure.

FIG. 10 shows a block diagram 1000 of a device 1005 that supports processing for multicast operation using multiple sets of processing resources in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information (e.g., information related to processing for multicast operation using multiple sets of processing resources) associated with various information channels (e.g., control channels, data channels, or any other information channels). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, using a first set of processing resources, a unicast message from a base station over a first component carrier during a first TTI, receive, using a second set of processing resources, a multicast message from the base station over the first component carrier during the first TTI, and transmit, to the base station using the first set of processing resources, a first feedback message associated with the unicast message. The communications manager 1015 may be an example of aspects of the communications manager 1310 described herein.

The communications manager 1015, or its sub-components, may be implemented in hardware, code (e.g., software) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
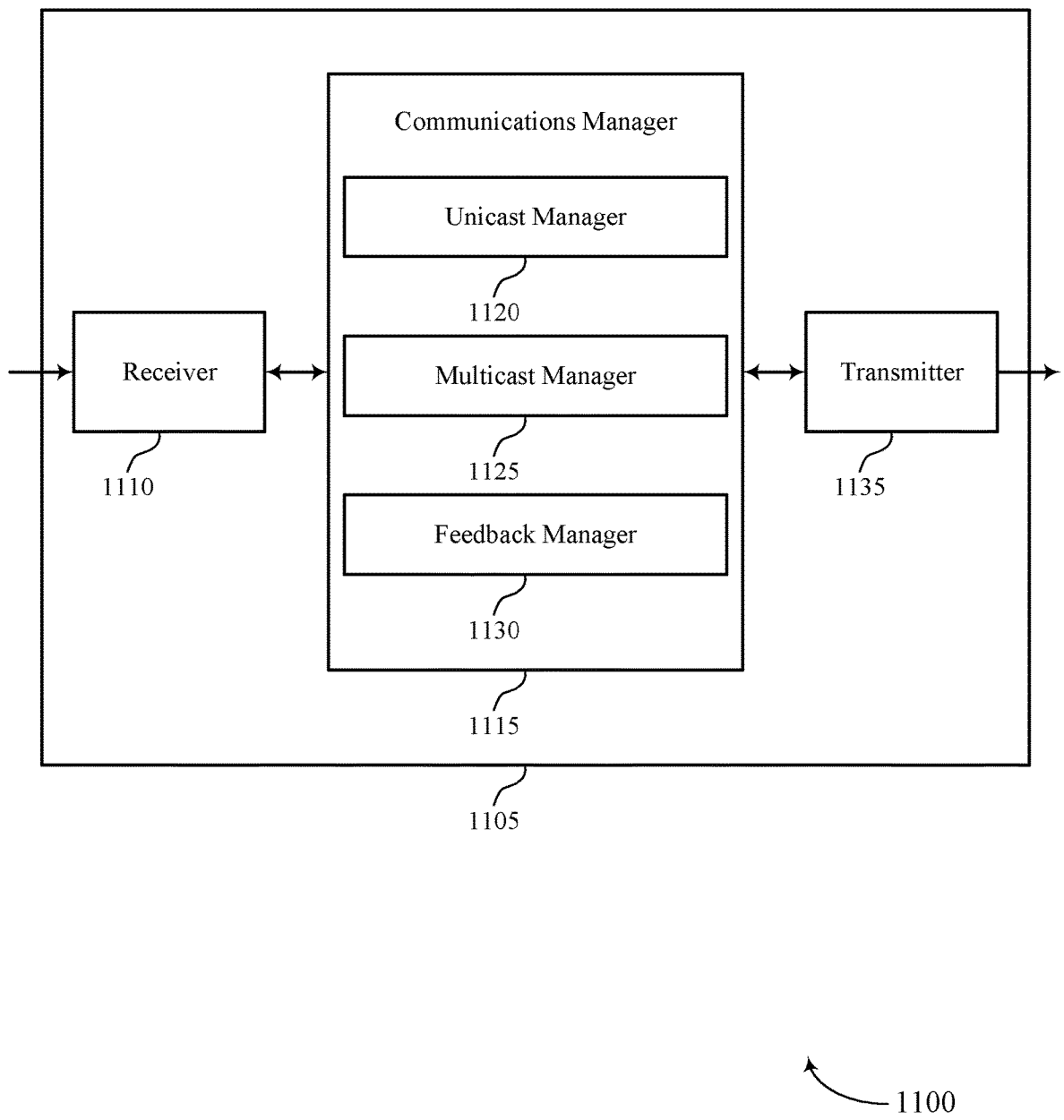

FIG. 11 shows a block diagram 1100 of a device 1105 that supports processing for multicast operation using multiple sets of processing resources in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information (e.g., information related to processing for multicast operation using multiple sets of processing resources) associated with various information channels (e.g., control channels, data channels, or any other information channels). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an unicast manager 1120, a multicast manager 1125, and a feedback manager 1130. The communications manager 1115 may be an example of aspects of the communications manager 1310 described herein.

The unicast manager 1120 may receive, using a first set of processing resources, a unicast message from a base station over a first component carrier during a first TTI.

The multicast manager 1125 may receive, using a second set of processing resources, a multicast message from the base station over the first component carrier during the first TTI.

The feedback manager 1130 may transmit, to the base station using the first set of processing resources, a first feedback message associated with the unicast message.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
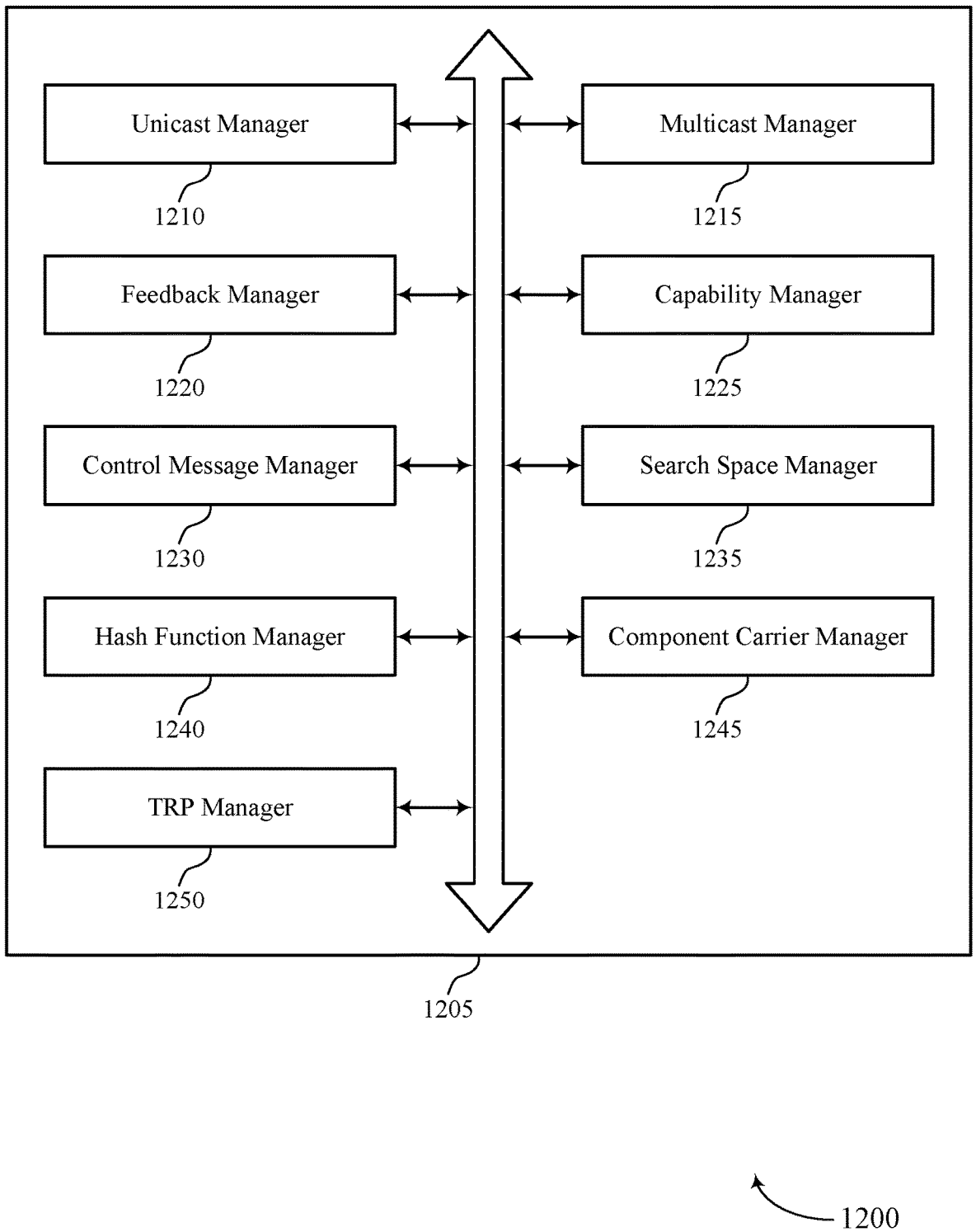
FIG. 12 shows a block diagram of a communications manager that supports processing for multicast operation using multiple sets of processing resources in accordance with aspects of the present disclosure.

FIG. 12 shows a block diagram 1200 of a communications manager 1205 that supports processing for multicast operation using multiple sets of processing resources in accordance with aspects of the present disclosure. The communications manager 1205 may be an example of aspects of a communications manager 1015, a communications manager 1115, or a communications manager 1310 described herein. The communications manager 1205 may include an unicast manager 1210, a multicast manager 1215, a feedback manager 1220, a capability manager 1225, a control message manager 1230, a search space manager 1235, a hash function manager 1240, a component carrier manager 1245, and a TRP manager 1250. Each of these modules may communicate, directly or indirectly, with one another (e.g., via one or more buses).

The unicast manager 1210 may receive, using a first set of processing resources, a unicast message from a base station over a first component carrier during a first TTI. In some examples, the unicast manager 1210 may receive, using the first set of processing resources, a first additional unicast message or a first additional multicast message from the base station over the first component carrier during a second TTI. In some examples, the unicast manager 1210 may receive, using the second set of processing resources, a second additional unicast message or a second additional multicast message from the base station over a second component carrier during the second TTI.

The multicast manager 1215 may receive, using a second set of processing resources, a multicast message from the base station over the first component carrier during the first TTI. In some cases, the unicast message and the multicast message are received in a different order than the first control message and the second control message, or where the first feedback message and a second feedback message associated with the multicast message are transmitted in a different order than the unicast message and the multicast message are received, or a combination thereof. In some cases, the first set of processing resources is associated with a first hybrid automatic repeat request process, and where the second set of processing resources is associated with a second hybrid automatic repeat request process. In some cases, the unicast message and the multicast message at least partially overlap in time.

The feedback manager 1220 may transmit, to the base station using the first set of processing resources, a first feedback message associated with the unicast message. In some examples, the feedback manager 1220 may transmit, to the base station using the second set of processing resources, a second feedback message associated with the multicast message.

The capability manager 1225 may transmit, to the base station, a capability message indicating the first set of processing resources and the second set of processing resources, where receiving the unicast message and receiving the multicast message are based on transmitting the indication.

The control message manager 1230 may receive, from the base station, a first control message including a grant of resources for the unicast message, where receiving the unicast message is based on receiving the first control message. In some examples, the control message manager 1230 may receive, from the base station, a second control message including a grant of resources for the multicast message, where receiving the multicast message is based on receiving the second control message. In some examples, the control message manager 1230 may receive, using the first set of processing resources, a first control message over the first component carrier, the first control message including a grant of resources for the first additional unicast message or the first additional multicast message, where receiving the first additional unicast message or the first additional multicast message is based on receiving the first control message. In some examples, the control message manager 1230 may receive, using the second set of processing resources, a second control message over the first component carrier, the second control message including a grant of resources for the second additional unicast message or the second additional multicast message, where receiving the second additional unicast message or the second additional multicast message over the second component carrier is based on receiving the second control message. In some examples, the control message manager 1230 may receive, using the second set of processing resources, a second control message over the second component carrier, the second control message including a grant of resources for the second additional unicast message or the second additional multicast message, where receiving the second additional unicast message or the second additional multicast message over the second component carrier is based on receiving the second control message.

The search space manager 1235 may identify a first set of search spaces for the first control message and a second set of search spaces for the second control message. In some examples, the search space manager 1235 may monitor the first set of search spaces, where receiving the first control message is based on monitoring the first set of search spaces. In some examples, the search space manager 1235 may monitor the second set of search spaces, where receiving the second control message is based on monitoring the second set of search spaces. In some examples, the search space manager 1235 may identify a set of search spaces including the first set of search spaces and the second set of search spaces. In some examples, the search space manager 1235 may prioritize a subset of the set of search spaces, the subset including the first set of search spaces and the second set of search spaces, where monitoring the first set of search spaces and monitoring the second set of search spaces is based on prioritizing the subset of the set of search spaces.

In some examples, the search space manager 1235 may refrain from monitoring a remainder of the set of search spaces based on prioritizing the subset of the set of search spaces. In some examples, the search space manager 1235 may prioritize one or more search spaces associated with the multicast message over one or more search spaces associated with the unicast message, or prioritizing one or more search spaces associated with the unicast message over one or more search spaces associated with the multicast message. In some examples, the search space manager 1235 may receive a prioritization message from the base station, the prioritization message indicating the subset of the set of search spaces, where prioritizing the subset of the set of search spaces is based on receiving the prioritization message. In some cases, a quantity of blind decoding procedures associated with the first set of search spaces and the second set of search spaces is greater than a quantity of blind decoding procedures associated with the first component carrier. In some cases, a quantity of blind decoding procedures associated with the first set of search spaces and the second set of search spaces is less than or equal to a quantity of blind decoding procedures associated with the first component carrier.

The hash function manager 1240 may perform, based on monitoring the first set of search spaces, a first hash function based on a UE identifier associated with the UE, where receiving the first control message is based on performing the first hash function. In some examples, the hash function manager 1240 may perform, based on monitoring the second set of search spaces, a second hash function based on a group identifier associated with a group of UEs including the UE, where receiving the second control message is based on performing the second hash function.

The component carrier manager 1245 may determine that one of the first set of processing resources and the second set of processing resources is associated with the first component carrier of a first frequency band, and another of the first set of processing resources and the second set of processing resources is associated with a second component carrier of the first frequency band. In some cases, one of the first set of processing resources and the second set of processing resources is associated with the first component carrier of a first frequency band, and another of the first set of processing resources and the second set of processing resources is associated with a second component carrier of a second frequency band.

The TRP manager 1250 may determine that one of the first set of processing resources and the second set of processing resources is associated with a first transmit receive point, and another of the first set of processing resources and the second set of processing resources is associated with a second transmit receive point.

Figure 13:
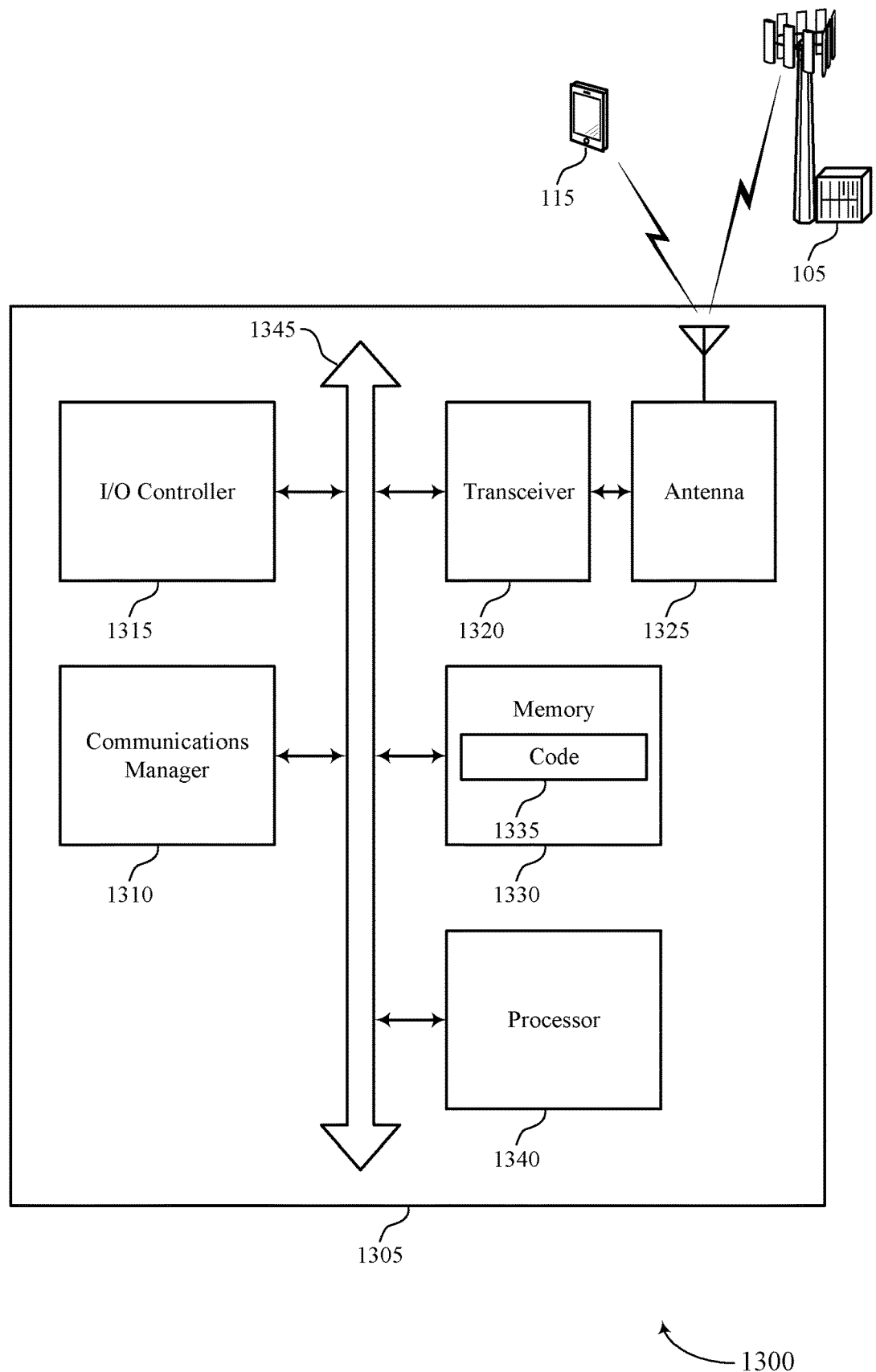
FIG. 13 shows a diagram of a system including a device that supports processing for multicast operation using multiple sets of processing resources in accordance with aspects of the present disclosure.

FIG. 13 shows a diagram of a system 1300 including a device 1305 that supports processing for multicast operation using multiple sets of processing resources in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive, using a first set of processing resources, a unicast message from a base station over a first component carrier during a first TTI, receive, using a second set of processing resources, a multicast message from the base station over the first component carrier during the first TTI, and transmit, to the base station using the first set of processing resources, a first feedback message associated with the unicast message.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting processing for multicast operation using multiple sets of processing resources).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
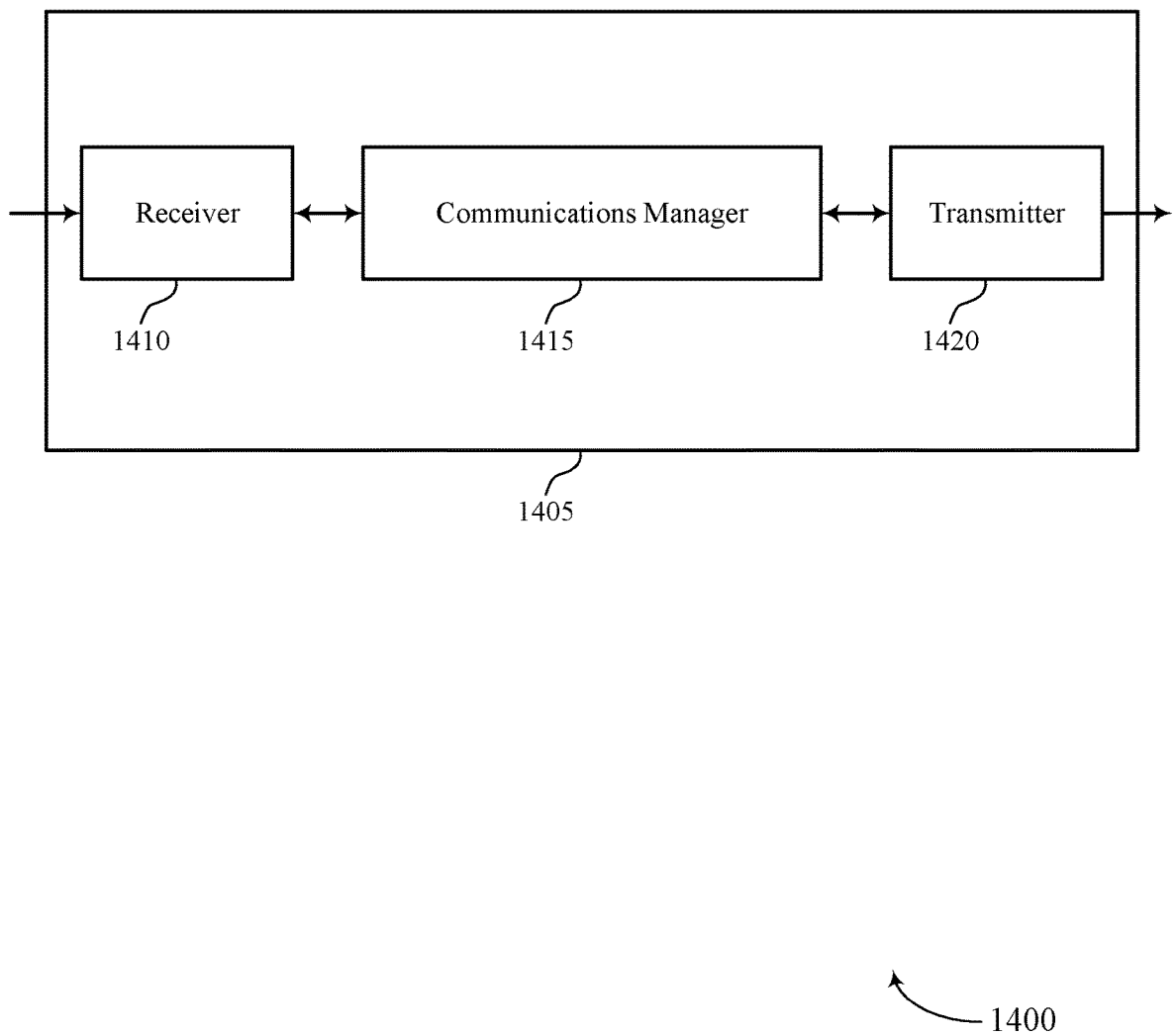
FIGS. 14 and 15 show block diagrams of devices that support processing for multicast operation using multiple sets of processing resources in accordance with aspects of the present disclosure.

FIG. 14 shows a block diagram 1400 of a device 1405 that supports processing for multicast operation using multiple sets of processing resources in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information (e.g., information related to processing for multicast operation using multiple sets of processing resources) associated with various information channels (e.g., control channels, data channels, or any other information channels). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit, to a UE, a unicast message over a first component carrier during a first TTI, transmit, to the UE, a multicast message over the first component carrier during the first TTI, and receive, from the UE, a first feedback message associated with the unicast message. The communications manager 1415 may be an example of aspects of the communications manager 1710 described herein.

The communications manager 1415, or its sub-components, may be implemented in hardware, code (e.g., software) executed by a processor, or any combination thereof. If implemented in code executed by a processor, the functions of the communications manager 1415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
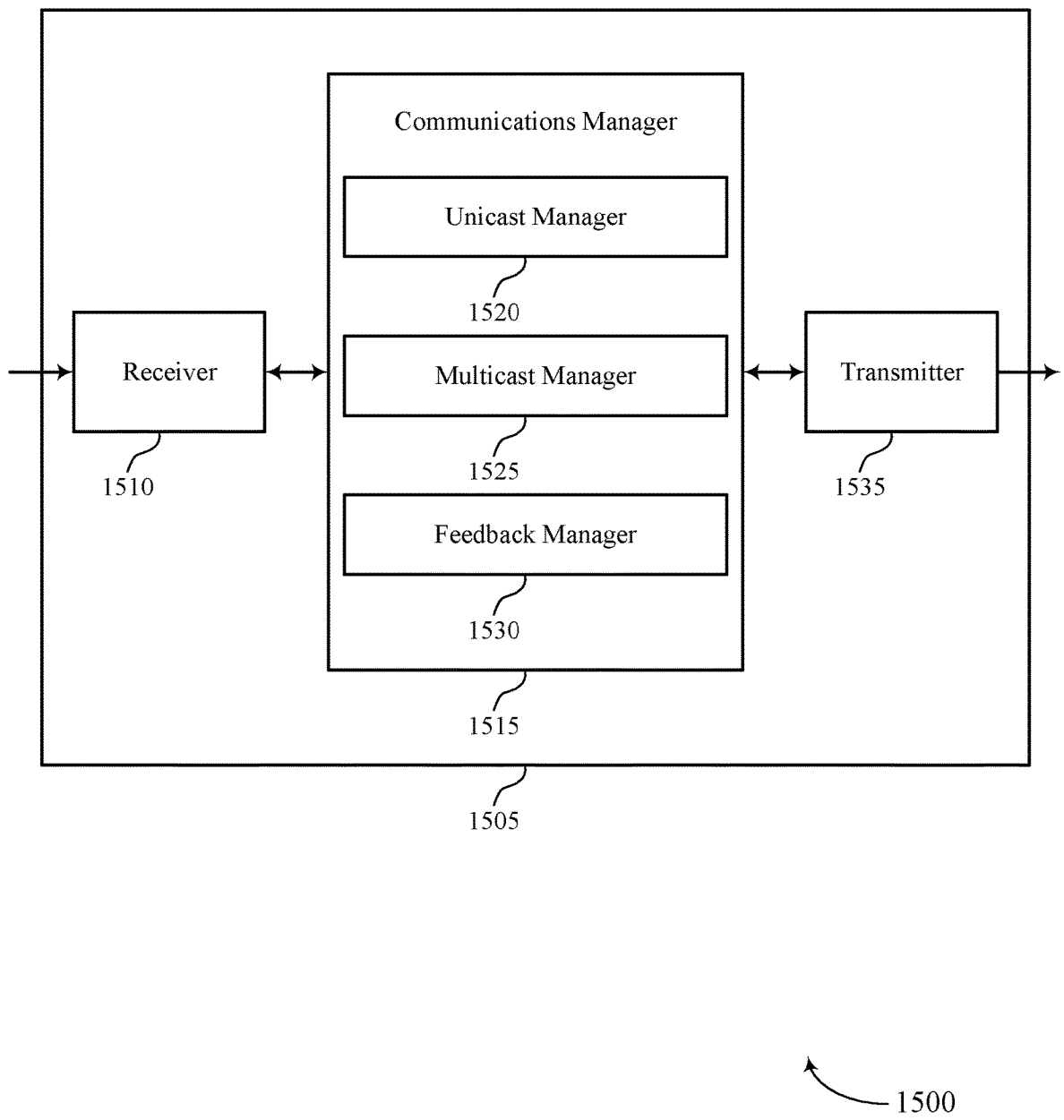

FIG. 15 shows a block diagram 1500 of a device 1505 that supports processing for multicast operation using multiple sets of processing resources in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information (e.g., information related to processing for multicast operation using multiple sets of processing resources) associated with various information channels (e.g., control channels, data channels, or any other information channels). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include an unicast manager 1520, a multicast manager 1525, and a feedback manager 1530. The communications manager 1515 may be an example of aspects of the communications manager 1710 described herein.

The unicast manager 1520 may transmit, to a UE, a unicast message over a first component carrier during a first TTI.

The multicast manager 1525 may transmit, to the UE, a multicast message over the first component carrier during the first TTI.

The feedback manager 1530 may receive, from the UE, a first feedback message associated with the unicast message.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
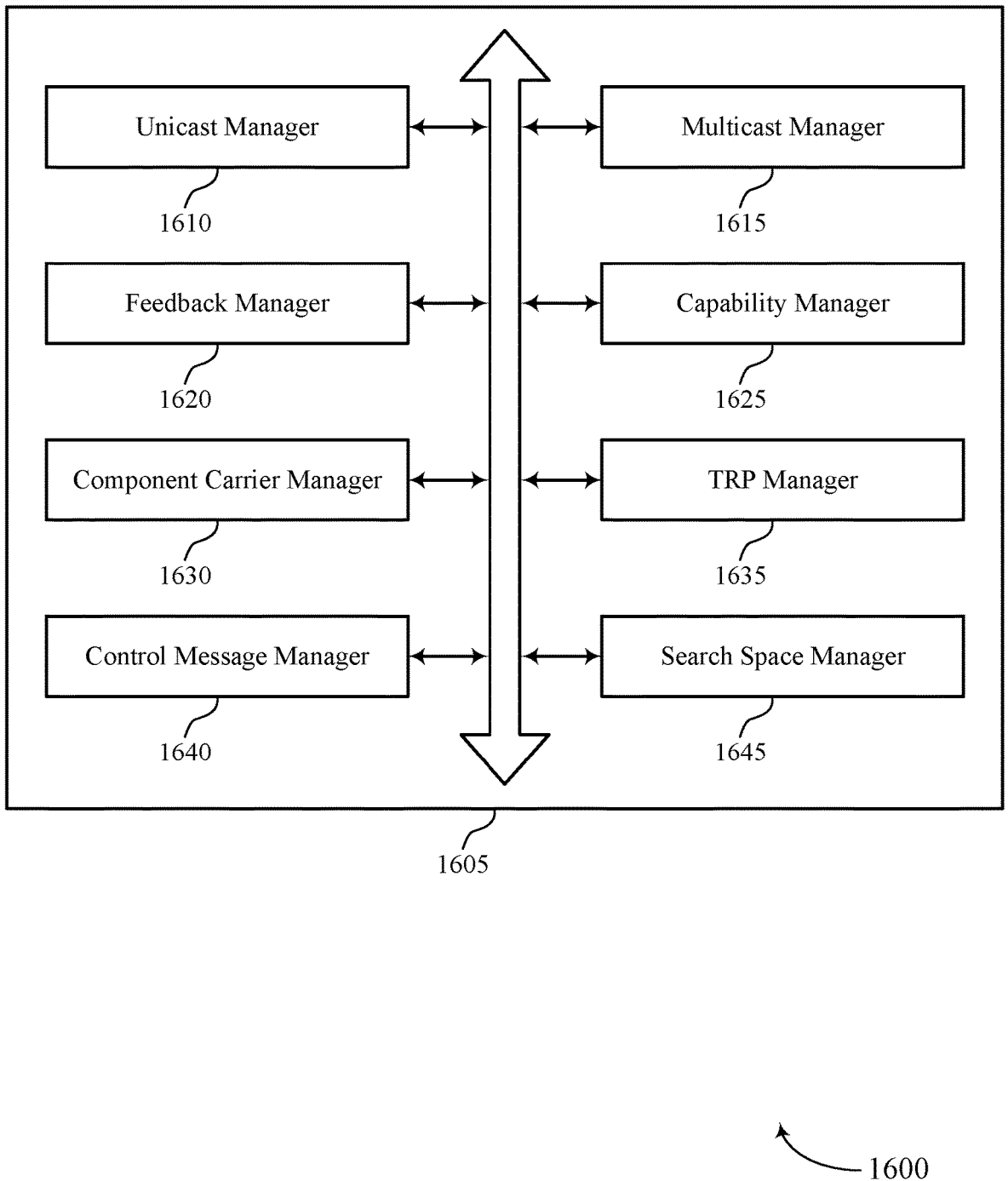
FIG. 16 shows a block diagram of a communications manager that supports processing for multicast operation using multiple sets of processing resources in accordance with aspects of the present disclosure.

FIG. 16 shows a block diagram 1600 of a communications manager 1605 that supports processing for multicast operation using multiple sets of processing resources in accordance with aspects of the present disclosure. The communications manager 1605 may be an example of aspects of a communications manager 1415, a communications manager 1515, or a communications manager 1710 described herein. The communications manager 1605 may include an unicast manager 1610, a multicast manager 1615, a feedback manager 1620, a capability manager 1625, a component carrier manager 1630, a TRP manager 1635, a control message manager 1640, and a search space manager 1645. Each of these modules may communicate, directly or indirectly, with one another (e.g., via one or more buses).

The unicast manager 1610 may transmit, to a UE, a unicast message over a first component carrier during a first TTI. In some examples, the unicast manager 1610 may transmit, to the UE, a first additional unicast message or a first additional multicast message from the base station over the first component carrier during a second TTI. In some examples, the unicast manager 1610 may transmit, to the UE, a second additional unicast message or a second additional multicast message from the base station over a second component carrier during the second TTI.

The multicast manager 1615 may transmit, to the UE, a multicast message over the first component carrier during the first TTI. In some cases, the unicast message and the multicast message at least partially overlap in time. In some cases, the unicast message and the multicast message are transmitted in a different order than the first control message and the second control message are transmitted, or where the first feedback message and a second feedback message associated with the multicast message are received in a different order than the unicast message and the multicast message are transmitted, or a combination thereof.

The feedback manager 1620 may receive, from the UE, a first feedback message associated with the unicast message. In some examples, the feedback manager 1620 may receive, from the UE, a second feedback message associated with the multicast message. In some cases, the first set of processing resources is associated with a first hybrid automatic repeat request process at the UE, and where the second set of processing resources is associated with a second hybrid automatic repeat request process at the UE.

The capability manager 1625 may receive, from the UE, a capability message indicating a first set of processing resources for receiving the unicast message by the UE and a second set of processing resources for receiving the multicast message by the UE, where transmitting the unicast message and transmitting the multicast message are based on receiving the indication.

The component carrier manager 1630 may determine that one of the first set of processing resources and the second set of processing resources is associated with the first component carrier of a first frequency band, and another of the first set of processing resources and the second set of processing resources is associated with a second component carrier of the first frequency band. In some cases, one of the first set of processing resources and the second set of processing resources is associated with the first component carrier of a first frequency band, and another of the first set of processing resources and the second set of processing resources is associated with a second component carrier of a second frequency band.

The TRP manager 1635 may determine that one of the first set of processing resources and the second set of processing resources is associated with a first transmit receive point, and another of the first set of processing resources and the second set of processing resources is associated with a second transmit receive point.

The control message manager 1640 may transmit, to the UE, a first control message including a grant of resources for the unicast message, where transmitting the unicast message is based on receiving the first control message. In some examples, the control message manager 1640 may transmit, to the UE, a second control message including a grant of resources for the multicast message, where transmitting the multicast message is based on receiving the second control message. In some examples, the control message manager 1640 may transmit, to the UE, a first control message over the first component carrier, the first control message including a grant of resources for the first additional unicast message or the first additional multicast message, where transmitting the first additional unicast message or the first additional multicast message is based on transmitting the first control message. In some examples, the control message manager 1640 may transmit, to the UE, a second control message over the first component carrier, the second control message including a grant of resources for the second additional unicast message or the second additional multicast message, where transmitting the second additional unicast message or the second additional multicast message over the second component carrier is based on transmitting the second control message. In some examples, the control message manager 1640 may transmit, to the UE, a second control message over the second component carrier, the second control message including a grant of resources for the second additional unicast message or the second additional multicast message, where transmitting the second additional unicast message or the second additional multicast message over the second component carrier is based on transmitting the second control message over the first component carrier.

The search space manager 1645 may identify a first set of search spaces for the first control message and a second set of search spaces for the second control message, where transmitting the first control message includes transmitting the first control message over one or more of the first set of search spaces, and where transmitting the second control message including transmitting the second control message over one or more of the second set of search spaces. In some examples, the search space manager 1645 may transmit, to the UE, a prioritization message indicating at least a portion of the first set of search spaces and at least a portion of the second set of search spaces.

Figure 17:
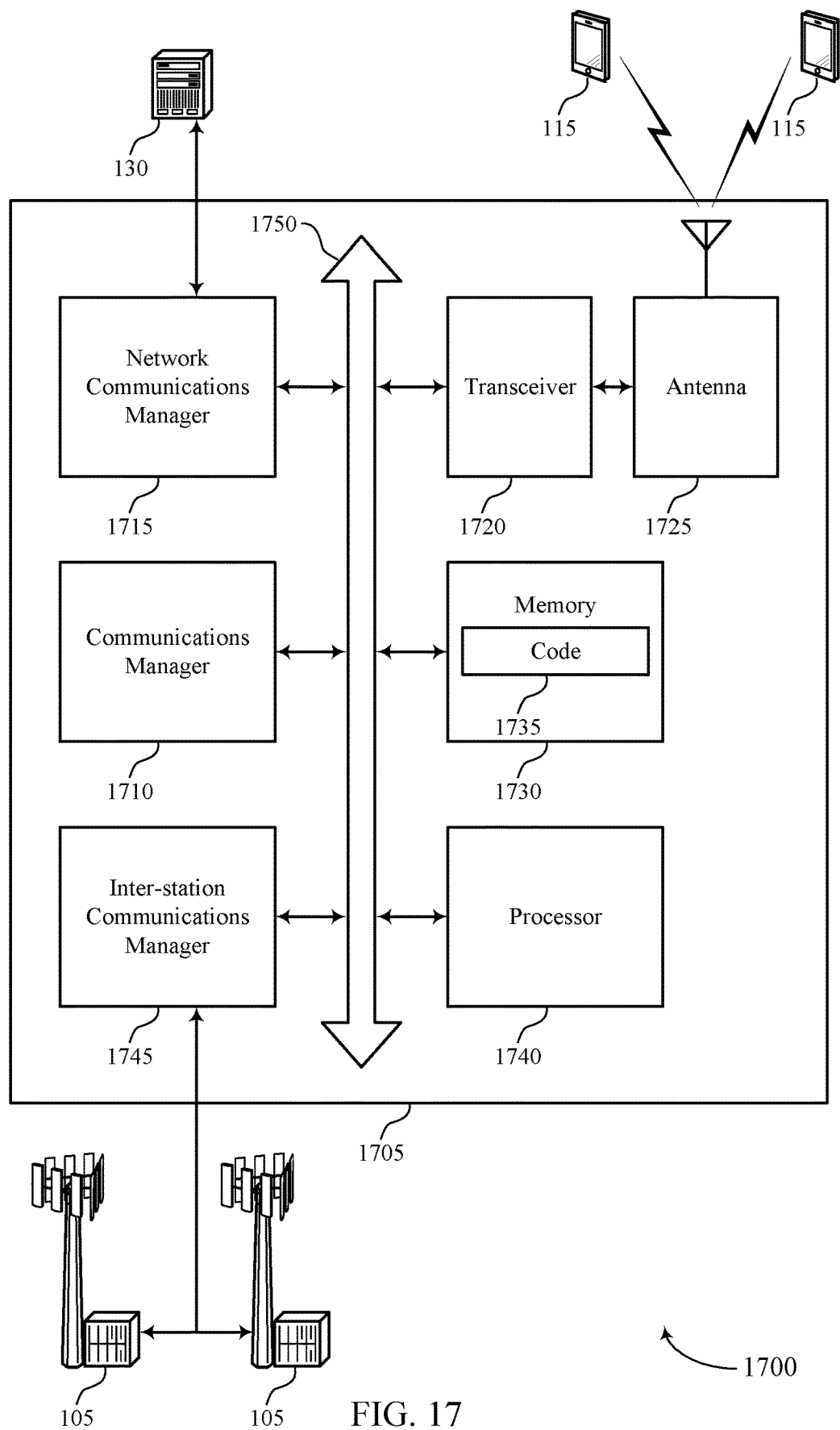
FIG. 17 shows a diagram of a system including a device that supports processing for multicast operation using multiple sets of processing resources in accordance with aspects of the present disclosure.

FIG. 17 shows a diagram of a system 1700 including a device 1705 that supports processing for multicast operation using multiple sets of processing resources in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit, to a UE, a unicast message over a first component carrier during a first TTI, transmit, to the UE, a multicast message over the first component carrier during the first TTI, and receive, from the UE, a first feedback message associated with the unicast message.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting processing for multicast operation using multiple sets of processing resources).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
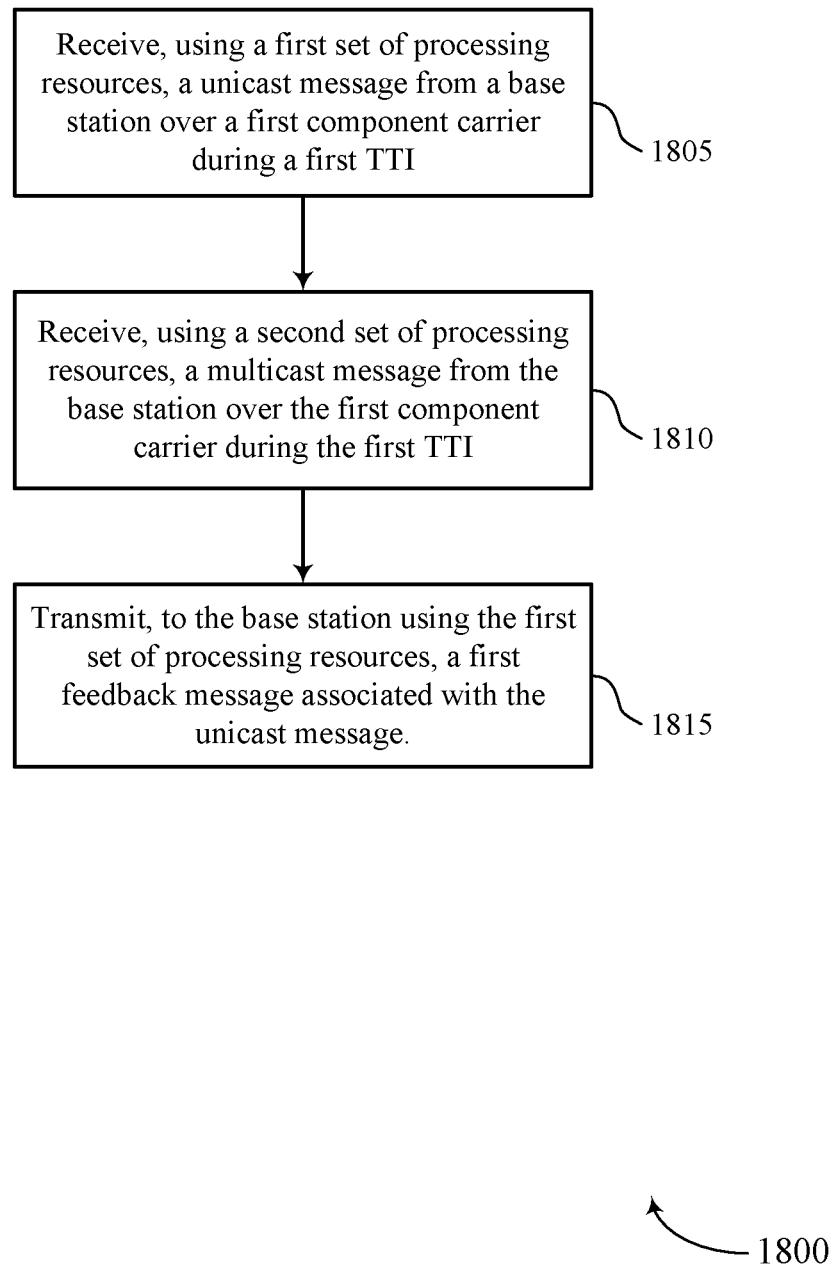
FIGS. 18 through 21 show flowcharts illustrating methods that support processing for multicast operation using multiple sets of processing resources in accordance with aspects of the present disclosure.

FIG. 18 shows a flowchart illustrating a method 1800 that supports processing for multicast operation using multiple sets of processing resources in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally, or alternatively, a UE may perform aspects of the functions described herein using special-purpose hardware.

At 1805, the UE may receive, using a first set of processing resources, a unicast message from a base station over a first component carrier during a first TTI. The operations of 1805 may be performed according to the methods described herein. In some examples, aspects of the operations of 1805 may be performed by a unicast manager as described with reference to FIGS. 10 through 13.

At 1810, the UE may receive, using a second set of processing resources, a multicast message from the base station over the first component carrier during the first TTI. The operations of 1810 may be performed according to the methods described herein. In some examples, aspects of the operations of 1810 may be performed by a multicast manager as described with reference to FIGS. 10 through 13.

At 1815, the UE may transmit, to the base station using the first set of processing resources, a first feedback message associated with the unicast message. The operations of 1815 may be performed according to the methods described herein. In some examples, aspects of the operations of 1815 may be performed by a feedback manager as described with reference to FIGS. 10 through 13.

Figure 19:
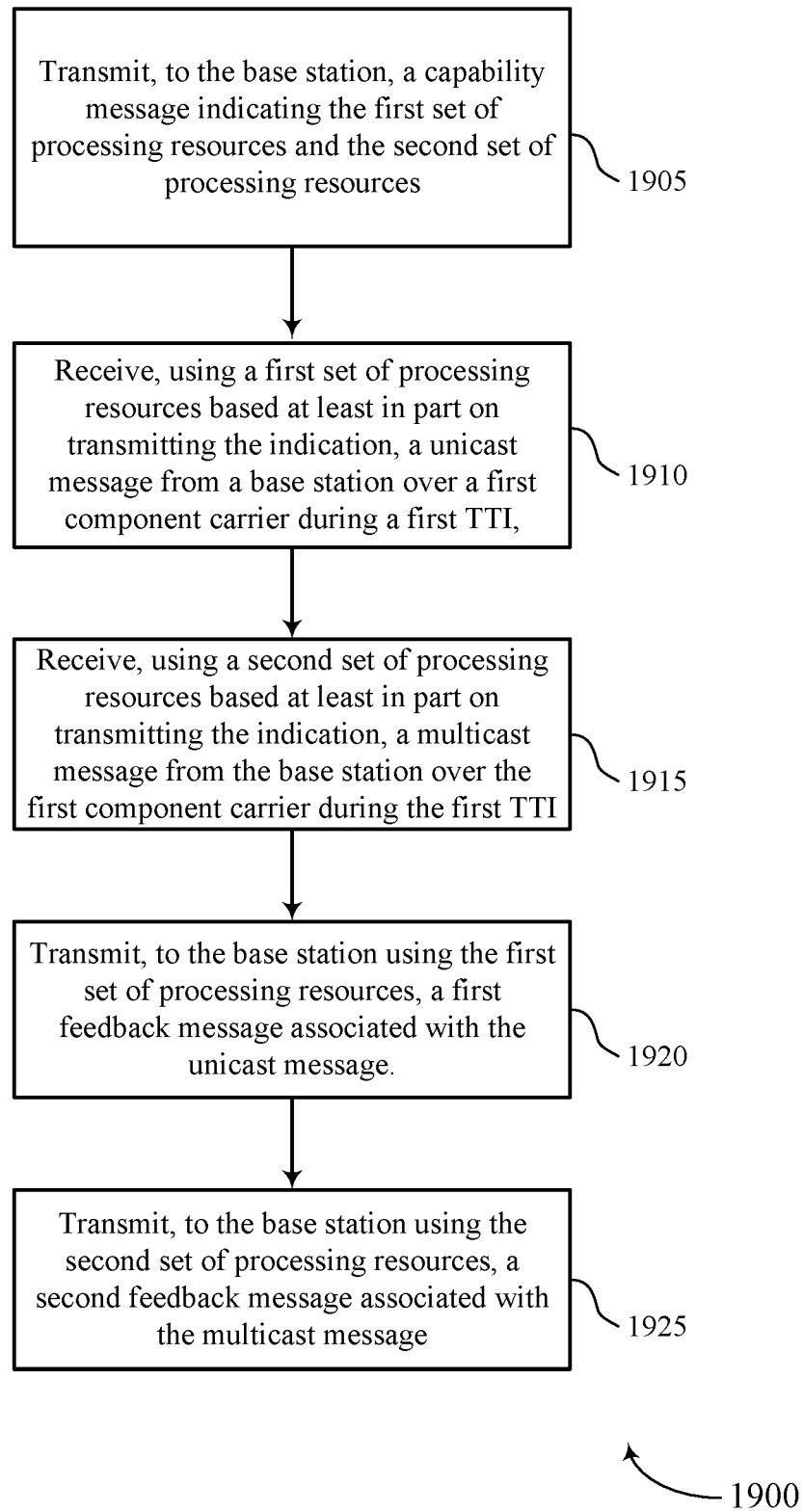

FIG. 19 shows a flowchart illustrating a method 1900 that supports processing for multicast operation using multiple sets of processing resources in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described herein. Additionally, or alternatively, a UE may perform aspects of the functions described herein using special-purpose hardware.

At 1905, the UE may transmit, to the base station, a capability message indicating the first set of processing resources and the second set of processing resources. The operations of 1905 may be performed according to the methods described herein. In some examples, aspects of the operations of 1905 may be performed by a capability manager as described with reference to FIGS. 10 through 13.

At 1910, the UE may receive, using a first set of processing resources based at least in part on transmitting the indication, a unicast message from a base station over a first component carrier during a first TTI. The operations of 1910 may be performed according to the methods described herein. In some examples, aspects of the operations of 1910 may be performed by a unicast manager as described with reference to FIGS. 10 through 13.

At 1915, the UE may receive, using a second set of processing resources based at least in part on transmitting the indication, a multicast message from the base station over the first component carrier during the first TTI. The operations of 1915 may be performed according to the methods described herein. In some examples, aspects of the operations of 1915 may be performed by a multicast manager as described with reference to FIGS. 10 through 13.

At 1920, the UE may transmit, to the base station using the first set of processing resources, a first feedback message associated with the unicast message. The operations of 1920 may be performed according to the methods described herein. In some examples, aspects of the operations of 1920 may be performed by a feedback manager as described with reference to FIGS. 10 through 13.

At 1925, the UE may transmit, to the base station using the second set of processing resources, a second feedback message associated with the multicast message. The operations of 1925 may be performed according to the methods described herein. In some examples, aspects of the operations of 1925 may be performed by a feedback manager as described with reference to FIGS. 10 through 13.

Figure 20:
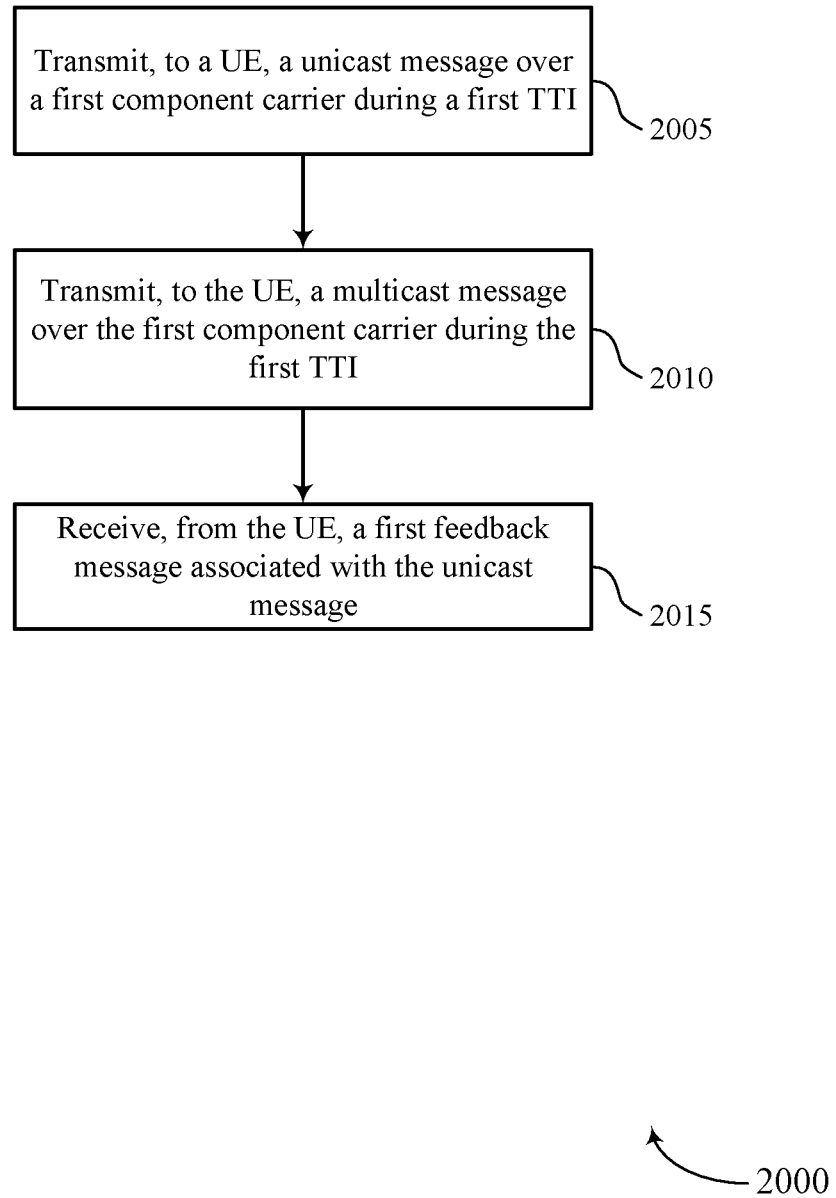

FIG. 20 shows a flowchart illustrating a method 2000 that supports processing for multicast operation using multiple sets of processing resources in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described herein. Additionally, or alternatively, a base station may perform aspects of the functions described herein using special-purpose hardware.

At 2005, the base station may transmit, to a UE, a unicast message over a first component carrier during a first TTI. The operations of 2005 may be performed according to the methods described herein. In some examples, aspects of the operations of 2005 may be performed by a unicast manager as described with reference to FIGS. 14 through 17.

At 2010, the base station may transmit, to the UE, a multicast message over the first component carrier during the first TTI. The operations of 2010 may be performed according to the methods described herein. In some examples, aspects of the operations of 2010 may be performed by a multicast manager as described with reference to FIGS. 14 through 17.

At 2015, the base station may receive, from the UE, a first feedback message associated with the unicast message. The operations of 2015 may be performed according to the methods described herein. In some examples, aspects of the operations of 2015 may be performed by a feedback manager as described with reference to FIGS. 14 through 17.

Figure 21:
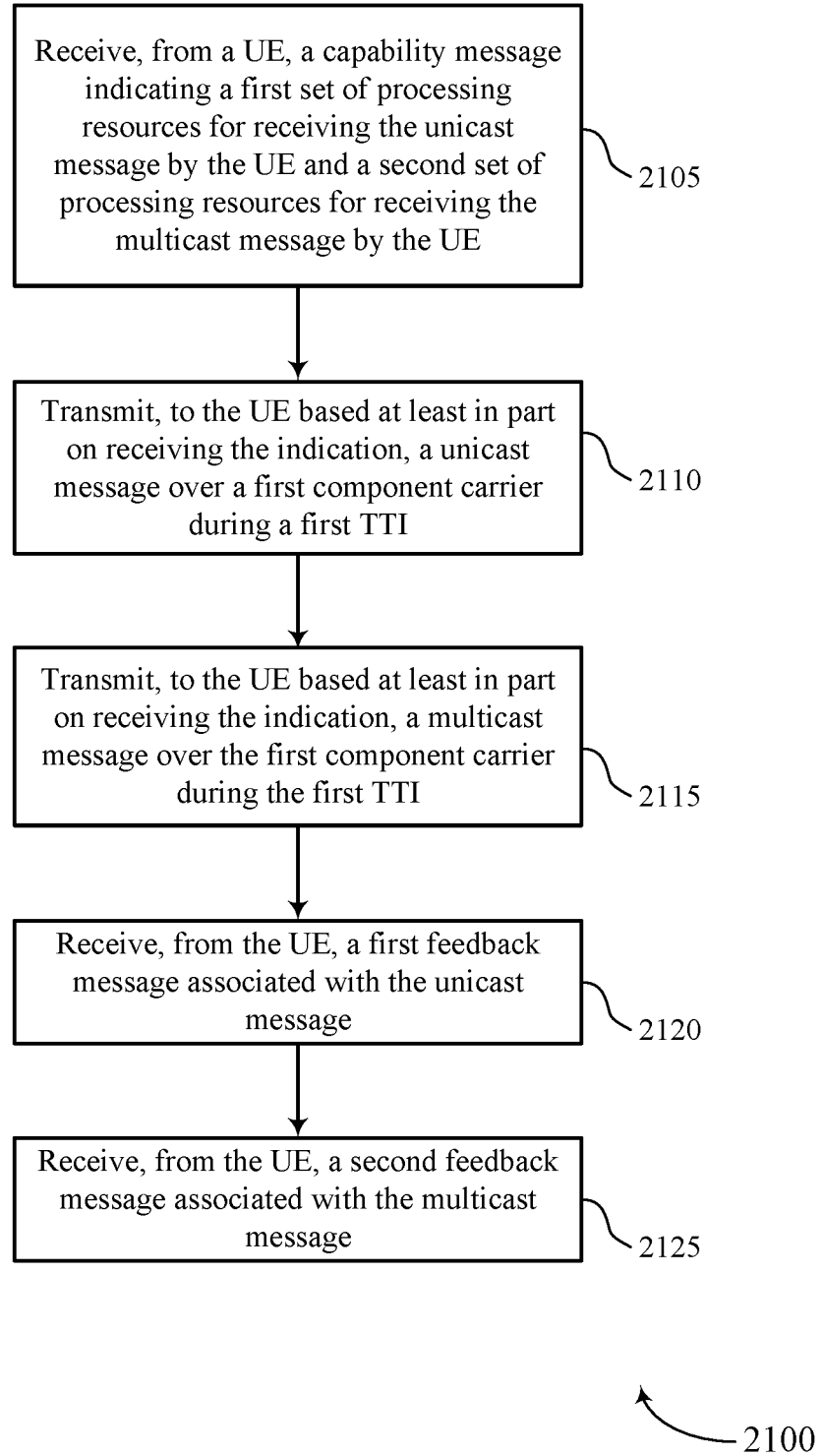

FIG. 21 shows a flowchart illustrating a method 2100 that supports processing for multicast operation using multiple sets of processing resources in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described herein. Additionally, or alternatively, a base station may perform aspects of the functions described herein using special-purpose hardware.

At 2105, the base station may receive, from a UE, a capability message indicating a first set of processing resources for receiving the unicast message by the UE and a second set of processing resources for receiving the multicast message by the UE, where transmitting the unicast message and transmitting the multicast message are based at least in part on receiving the indication. The operations of 2105 may be performed according to the methods described herein. In some examples, aspects of the operations of 2105 may be performed by a capability manager as described with reference to FIGS. 14 through 17.

At 2110, the base station may transmit, to the UE, a unicast message over a first component carrier during a first TTI. The operations of 2110 may be performed according to the methods described herein. In some examples, aspects of the operations of 2110 may be performed by a unicast manager as described with reference to FIGS. 14 through 17.

At 2115, the base station may transmit, to the UE, a multicast message over the first component carrier during the first TTI. The operations of 2115 may be performed according to the methods described herein. In some examples, aspects of the operations of 2115 may be performed by a multicast manager as described with reference to FIGS. 14 through 17.

At 2120, the base station may receive, from the UE, a first feedback message associated with the unicast message. The operations of 2120 may be performed according to the methods described herein. In some examples, aspects of the operations of 2120 may be performed by a feedback manager as described with reference to FIGS. 14 through 17.

At 2125, the base station may receive, from the UE, a second feedback message associated with the multicast message. The operations of 2125 may be performed according to the methods described herein. In some examples, aspects of the operations of 2125 may be performed by a feedback manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a UE, comprising: receiving, using a first set of processing resources, a unicast message from a base station over a first component carrier during a first TTI; receiving, using a second set of processing resources, a multicast message from the base station over the first component carrier during the first TTI; and transmitting, to the base station using the first set of processing resources, a first feedback message associated with the unicast message.

Aspect 2: The method of aspect 1, further comprising: transmitting, to the base station using the second set of processing resources, a second feedback message associated with the multicast message.

Aspect 3: The method of any of aspects 1 through 2, further comprising: transmitting, to the base station, a capability message indicating the first set of processing resources and the second set of processing resources, wherein receiving the unicast message and receiving the multicast message are based at least in part on transmitting the indication.

Aspect 4: The method of any of aspects 1 through 3, further comprising: receiving, from the base station, a first control message comprising a grant of resources for the unicast message, wherein receiving the unicast message is based at least in part on receiving the first control message; and receiving, from the base station, a second control message comprising a grant of resources for the multicast message, wherein receiving the multicast message is based at least in part on receiving the second control message.

Aspect 5: The method of aspect 4, further comprising: identifying a first set of search spaces for the first control message and a second set of search spaces for the second control message; monitoring the first set of search spaces, wherein receiving the first control message is based at least in part on monitoring the first set of search spaces; and monitoring the second set of search spaces, wherein receiving the second control message is based at least in part on monitoring the second set of search spaces.

Aspect 6: The method of aspect 5, further comprising: performing, based at least in part on monitoring the first set of search spaces, a first hash function based on a UE identifier associated with the UE, wherein receiving the first control message is based at least in part on performing the first hash function; and performing, based at least in part on monitoring the second set of search spaces, a second hash function based on a group identifier associated with a group of UEs comprising the UE, wherein receiving the second control message is based at least in part on performing the second hash function.

Aspect 7: The method of any of aspects 5 through 6, wherein a quantity of blind decoding procedures associated with the first set of search spaces and the second set of search spaces is greater than a quantity of blind decoding procedures associated with the first component carrier.

Aspect 8: The method of any of aspects 5 through 7, wherein a quantity of blind decoding procedures associated with the first set of search spaces and the second set of search spaces is less than or equal to a quantity of blind decoding procedures associated with the first component carrier.

Aspect 9: The method of any of aspects 5 through 8, further comprising: identifying a plurality of search spaces comprising the first set of search spaces and the second set of search spaces; prioritizing a subset of the plurality of search spaces, the subset comprising the first set of search spaces and the second set of search spaces, wherein monitoring the first set of search spaces and monitoring the second set of search spaces is based at least in part on prioritizing the subset of the plurality of search spaces; and refraining from monitoring a remainder of the plurality of search spaces based at least in part on prioritizing the subset of the plurality of search spaces.

Aspect 10: The method of aspect 9, wherein prioritizing the subset of the plurality of search spaces comprises: prioritizing one or more search spaces associated with the multicast message over one or more search spaces associated with the unicast message, or prioritizing one or more search spaces associated with the unicast message over one or more search spaces associated with the multicast message.

Aspect 11: The method of any of aspects 9 through 10, further comprising: receiving a prioritization message from the base station, the prioritization message indicating the subset of the plurality of search spaces, wherein prioritizing the subset of the plurality of search spaces is based at least in part on receiving the prioritization message.

Aspect 12: The method of any of aspects 4 through 11, wherein the unicast message and the multicast message are received in a different order than the first control message and the second control message, or the first feedback message and a second feedback message associated with the multicast message are transmitted in a different order than the unicast message and the multicast message are received, or a combination thereof.

Aspect 13: The method of any of aspects 1 through 12, wherein the first set of processing resources is associated with a first hybrid automatic repeat request process, and the second set of processing resources is associated with a second hybrid automatic repeat request process.

Aspect 14: The method of aspect 13, wherein the unicast message and the multicast message at least partially overlap in time.

Aspect 15: The method of any of aspects 1 through 14, wherein one of the first set of processing resources and the second set of processing resources is associated with the first component carrier of a first frequency band, and another of the first set of processing resources and the second set of processing resources is associated with a second component carrier of the first frequency band.

Aspect 16: The method of any of aspects 1 through 15, wherein one of the first set of processing resources and the second set of processing resources is associated with the first component carrier of a first frequency band, and another of the first set of processing resources and the second set of processing resources is associated with a second component carrier of a second frequency band.

Aspect 17: The method of any of aspects 1 through 16, wherein one of the first set of processing resources and the second set of processing resources is associated with a first transmit receive point, and another of the first set of processing resources and the second set of processing resources is associated with a second transmit receive point.

Aspect 18: The method of any of aspects 1 through 17, further comprising: receiving, using the first set of processing resources, a first additional unicast message or a first additional multicast message from the base station over the first component carrier during a second TTI; and receiving, using the second set of processing resources, a second additional unicast message or a second additional multicast message from the base station over a second component carrier during the second TTI.

Aspect 19: The method of aspect 18, further comprising: receiving, using the first set of processing resources, a first control message over the first component carrier, the first control message comprising a grant of resources for the first additional unicast message or the first additional multicast message, wherein receiving the first additional unicast message or the first additional multicast message is based at least in part on receiving the first control message; and receiving, using the second set of processing resources, a second control message over the first component carrier, the second control message comprising a grant of resources for the second additional unicast message or the second additional multicast message, wherein receiving the second additional unicast message or the second additional multicast message over the second component carrier is based at least in part on receiving the second control message.

Aspect 20: The method of any of aspects 18 through 19, further comprising: receiving, using the first set of processing resources, a first control message over the first component carrier, the first control message comprising a grant of resources for the first additional unicast message or the first additional multicast message, wherein receiving the first additional unicast message or the first additional multicast message is based at least in part on receiving the first control message; and receiving, using the second set of processing resources, a second control message over the second component carrier, the second control message comprising a grant of resources for the second additional unicast message or the second additional multicast message, wherein receiving the second additional unicast message or the second additional multicast message over the second component carrier is based at least in part on receiving the second control message.

Aspect 21: A method for wireless communications at a base station, comprising: transmitting, to a UE, a unicast message over a first component carrier during a first TTI; transmitting, to the UE, a multicast message over the first component carrier during the first TTI; and receiving, from the UE, a first feedback message associated with the unicast message.

Aspect 22: The method of aspect 21, further comprising: receiving, from the UE, a second feedback message associated with the multicast message.

Aspect 23: The method of any of aspects 21 through 22, further comprising: receiving, from the UE, a capability message indicating a first set of processing resources for receiving the unicast message by the UE and a second set of processing resources for receiving the multicast message by the UE, wherein transmitting the unicast message and transmitting the multicast message are based at least in part on receiving the indication.

Aspect 24: The method of aspect 23, wherein the first set of processing resources is associated with a first hybrid automatic repeat request process at the UE, and the second set of processing resources is associated with a second hybrid automatic repeat request process at the UE.

Aspect 25: The method of aspect 24, wherein the unicast message and the multicast message at least partially overlap in time.

Aspect 26: The method of any of aspects 23 through 25, wherein one of the first set of processing resources and the second set of processing resources is associated with the first component carrier of a first frequency band, and another of the first set of processing resources and the second set of processing resources is associated with a second component carrier of the first frequency band.

Aspect 27: The method of any of aspects 23 through 26, wherein one of the first set of processing resources and the second set of processing resources is associated with the first component carrier of a first frequency band, and another of the first set of processing resources and the second set of processing resources is associated with a second component carrier of a second frequency band.

Aspect 28: The method of any of aspects 23 through 27, wherein one of the first set of processing resources and the second set of processing resources is associated with a first transmit receive point, and another of the first set of processing resources and the second set of processing resources is associated with a second transmit receive point.

Aspect 29: The method of any of aspects 21 through 28, further comprising: transmitting, to the UE, a first control message comprising a grant of resources for the unicast message, wherein transmitting the unicast message is based at least in part on receiving the first control message; and transmitting, to the UE, a second control message comprising a grant of resources for the multicast message, wherein transmitting the multicast message is based at least in part on receiving the second control message.

Aspect 30: The method of aspect 29, further comprising: identifying a first set of search spaces for the first control message and a second set of search spaces for the second control message, wherein transmitting the first control message comprises transmitting the first control message over one or more of the first set of search spaces, and wherein transmitting the second control message comprising transmitting the second control message over one or more of the second set of search spaces.

Aspect 31: The method of aspect 30, further comprising: transmitting, to the UE, a prioritization message indicating at least a portion of the first set of search spaces and at least a portion of the second set of search spaces.

Aspect 32: The method of any of aspects 30 through 31, wherein the unicast message and the multicast message are transmitted in a different order than the first control message and the second control message are transmitted, or the first feedback message and a second feedback message associated with the multicast message are received in a different order than the unicast message and the multicast message are transmitted, or a combination thereof.

Aspect 33: The method of any of aspects 21 through 32, further comprising: transmitting, to the UE, a first additional unicast message or a first additional multicast message from the base station over the first component carrier during a second TTI; and transmitting, to the UE, a second additional unicast message or a second additional multicast message from the base station over a second component carrier during the second TTI.

Aspect 34: The method of aspect 33, further comprising: transmitting, to the UE, a first control message over the first component carrier, the first control message comprising a grant of resources for the first additional unicast message or the first additional multicast message, wherein transmitting the first additional unicast message or the first additional multicast message is based at least in part on transmitting the first control message; and transmitting, to the UE, a second control message over the first component carrier, the second control message comprising a grant of resources for the second additional unicast message or the second additional multicast message, wherein transmitting the second additional unicast message or the second additional multicast message over the second component carrier is based at least in part on transmitting the second control message.

Aspect 35: The method of any of aspects 33 through 34, further comprising: transmitting, to the UE, a first control message over the first component carrier, the first control message comprising a grant of resources for the first additional unicast message or the first additional multicast message, wherein transmitting the first additional unicast message or the first additional multicast message is based at least in part on transmitting the first control message; and transmitting, to the UE, a second control message over the second component carrier, the second control message comprising a grant of resources for the second additional unicast message or the second additional multicast message, wherein transmitting the second additional unicast message or the second additional multicast message over the second component carrier is based at least in part on transmitting the second control message over the first component carrier.

Aspect 36: An apparatus for wireless communications at a UE, comprising a processor; memory coupled with the processor; and instructions stored in the memory and executable by the processor to cause the apparatus to perform a method of any of aspects 1 through 20.

Aspect 37: An apparatus for wireless communications at a UE, comprising at least one means for performing a method of any of aspects 1 through 20.

Aspect 38: A non-transitory computer-readable medium storing code for wireless communications at a UE, the code comprising instructions executable by a processor to perform a method of any of aspects 1 through 20.

Aspect 39: An apparatus for wireless communications at a base station, comprising a processor; memory coupled with the processor; and instructions stored in the memory and executable by the processor to cause the apparatus to perform a method of any of aspects 21 through 35.

Aspect 40: An apparatus for wireless communications at a base station, comprising at least one means for performing a method of any of aspects 21 through 35.

Aspect 41: A non-transitory computer-readable medium storing code for wireless communications at a base station, the code comprising instructions executable by a processor to perform a method of any of aspects 21 through 35.

While certain examples herein may be explained in terms of resources that may otherwise be used to support communications via different CCs being used to support concurrent unicast and multicast communications, it is to be understood that like techniques may be additionally or alternatively applied to support concurrent unicast and multicast communications using resources that may otherwise be used to support communications via different TRPs, associated with different HARQ processes, or other sets of like processing resources.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations. An apparatus described herein may refer to a device (e.g., a UE, a base station, or any other device), any component within a device, or any collection of devices.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, using a first set of processing resources and based at least in part on a first quantity of blind decoding associated with a first set of search spaces, a message for unicast operations from a network entity during a first transmission time interval (TTI), the first set of search spaces associated with the message for unicast operations;
receiving, using a second set of processing resources and based at least in part on a second quantity of blind decoding associated with a second set of search spaces, a message for multicast operations from the network entity during the first TTI, the second set of search spaces associated with the message for multicast operations; and
transmitting, to the network entity using the first set of processing resources, a first feedback message associated with the message for unicast operations.

2. The method of claim 1, further comprising:
transmitting, to the network entity using the second set of processing resources, a second feedback message associated with the message for multicast operations, wherein the first feedback message and the second feedback message are hybrid automatic repeat request feedback messages.

3. The method of claim 1, further comprising:
transmitting, to the network entity, a capability message indicating the first set of processing resources and the second set of processing resources, wherein receiving the message for unicast operations and receiving the message for multicast operations are based at least in part on transmitting the indication.

4. The method of claim 1, further comprising:
receiving, from the network entity, a first control message comprising a grant of resources for the message for unicast operations, wherein receiving the message for unicast operations is based at least in part on receiving the first control message; and
receiving, from the network entity, a second control message comprising a grant of resources for the message for multicast operations, wherein receiving the message for multicast operations is based at least in part on receiving the second control message.

5. The method of claim 4, further comprising:
identifying the first set of search spaces for the first control message and the second set of search spaces for the second control message;
monitoring the first set of search spaces, wherein receiving the first control message is based at least in part on monitoring the first set of search spaces; and
monitoring the second set of search spaces, wherein receiving the second control message is based at least in part on monitoring the second set of search spaces.

6. The method of claim 5, further comprising:
performing, based at least in part on monitoring the first set of search spaces, a first hash function based on a UE identifier associated with the UE, wherein receiving the first control message is based at least in part on performing the first hash function; and
performing, based at least in part on monitoring the second set of search spaces, a second hash function based on a group identifier associated with a group of UEs comprising the UE, wherein receiving the second control message is based at least in part on performing the second hash function.

7. The method of claim 5, wherein the first quantity of blind decoding and the second quantity of blind decoding are greater than a quantity of blind decoding procedures associated with a first component carrier, wherein the message for unicast operations and the message for multicast operations are received via the first component carrier.

8. The method of claim 5, wherein the first quantity of blind decoding and the second quantity of blind decoding are less than or equal to a quantity of blind decoding procedures associated with a first component carrier, wherein the message for unicast operations and the message for multicast operations are received via the first component carrier.

9. The method of claim 5, further comprising:
identifying a plurality of search spaces comprising the first set of search spaces and the second set of search spaces;
prioritizing a subset of the plurality of search spaces, the subset comprising the first set of search spaces and the second set of search spaces, wherein monitoring the first set of search spaces and monitoring the second set of search spaces is based at least in part on prioritizing the subset of the plurality of search spaces; and
refraining from monitoring a remainder of the plurality of search spaces based at least in part on prioritizing the subset of the plurality of search spaces.

10. The method of claim 9, wherein prioritizing the subset of the plurality of search spaces comprises:
prioritizing one or more search spaces associated with the message for multicast operations over one or more search spaces associated with the message for unicast operations, or prioritizing one or more search spaces associated with the message for unicast operations over one or more search spaces associated with the message for multicast operations.

11. The method of claim 9, further comprising:
receiving a prioritization message from the network entity, the prioritization message indicating the subset of the plurality of search spaces, wherein prioritizing the subset of the plurality of search spaces is based at least in part on receiving the prioritization message.

12. The method of claim 4, wherein:
an order of reception for the message for unicast operations and the message for multicast operations is different than an order of reception for the first control message and the second control message; or
an order of transmission for the first feedback message and a second feedback message associated with the message for multicast operations is different than the order of reception for the message for unicast operations and the message for multicast operations.

13. The method of claim 1, wherein the first set of processing resources is associated with a first hybrid automatic repeat request process, and wherein the second set of processing resources is associated with a second hybrid automatic repeat request process.

14. The method of claim 13, wherein the message for unicast operations and the message for multicast operations at least partially overlap in time.

15. The method of claim 1, wherein one of the first set of processing resources and the second set of processing resources is associated with a first component carrier of a first frequency band, and another of the first set of processing resources and the second set of processing resources is associated with a second component carrier of the first frequency band, the first set of processing resources comprising a first quantity of baseband processing units and the second set of processing resources comprising a second quantity of baseband processing units.

16. The method of claim 1, wherein one of the first set of processing resources and the second set of processing resources is associated with a first component carrier of a first frequency band, and another of the first set of processing resources and the second set of processing resources is associated with a second component carrier of a second frequency band.

17. The method of claim 1, wherein one of the first set of processing resources and the second set of processing resources is associated with a first transmit receive point, and another of the first set of processing resources and the second set of processing resources is associated with a second transmit receive point.

18. The method of claim 1, further comprising:
receiving, using the first set of processing resources, a first additional message for unicast operations or a first additional message for multicast operations from the network entity during a second TTI; and
receiving, using the second set of processing resources, a second additional message for unicast operations or a second additional message for multicast operations from the network entity during the second TTI.

19. The method of claim 18, further comprising:
receiving, using the first set of processing resources, a first control message, the first control message comprising a grant of resources for the first additional message for unicast operations or the first additional message for multicast operations, wherein receiving the first additional message for unicast operations or the first additional message for multicast operations is based at least in part on receiving the first control message; and
receiving, using the second set of processing resources, a second control message, the second control message comprising a grant of resources for the second additional message for unicast operations or the second additional message for multicast operations, wherein receiving the second additional message for unicast operations or the second additional message for multicast operations is based at least in part on receiving the second control message.

20. The method of claim 4, wherein:
the order of reception for the message for unicast operations and the message for multicast operations is different than the order of reception for the first control message and the second control message; and
the order of transmission for the first feedback message and the second feedback message is different than the order of reception for the message for unicast operations and the message for multicast operations.

21. A method for wireless communications at a network entity, comprising:
receiving, from a user equipment (UE), a capability message indicating a capability of the UE related to receiving both a message for unicast operations and a message for multicast operations during a same transmission time interval (TTI);
transmitting, to the UE and based at least in part on a first quantity of blind decoding associated with a first set of search spaces, a message for unicast operations during a first TTI, the first set of search spaces associated with the message for unicast operations;
transmitting, to the UE and based at least in part on a second quantity of blind decoding associated with a second set of search spaces, a message for multicast operations during the first TTI, the second set of search spaces associated with the message for multicast operations; and
receiving, from the UE, a first feedback message associated with the message for unicast operations.

22. The method of claim 21, further comprising:
receiving, from the UE, a second feedback message associated with the message for multicast operations, wherein the first feedback message and the second feedback message are hybrid automatic repeat request feedback messages.

23. The method of claim 21, wherein receiving the capability message further comprises:
receiving, from the UE, the capability message indicating a first set of processing resources for receiving the message for unicast operations by the UE and a second set of processing resources for receiving the message for multicast operations by the UE, wherein transmitting the message for unicast operations and transmitting the message for multicast operations are based at least in part on receiving the indication.

24. The method of claim 21, further comprising:
transmitting, to the UE, a first control message comprising a grant of resources for the message for unicast operations, wherein transmitting the message for unicast operations is based at least in part on receiving the first control message; and
transmitting, to the UE, a second control message comprising a grant of resources for the message for multicast operations, wherein transmitting the message for multicast operations is based at least in part on receiving the second control message.

25. An apparatus for wireless communications at a user equipment (UE), comprising:
at least one processor, and
memory coupled with the at least one processor, the memory storing instructions for the at least one processor to cause the apparatus to:
receive, using a first set of processing resources and based at least in part on a first quantity of blind decoding associated with a first set of search spaces, a message for unicast operations from a network entity during a first transmission time interval (TTI), the first set of search spaces associated with the message for unicast operations;
receive, using a second set of processing resources and based at least in part on a second quantity of blind decoding associated with a second set of search spaces, a message for multicast operations from the network entity during the first TTI, the second set of search spaces associated with the message for multicast operations; and
transmit, to the network entity using the first set of processing resources, a first feedback message associated with the message for unicast operations.

26. The apparatus of claim 25, wherein the instructions are further for the at least one processor to cause the apparatus to:
transmit, to the network entity using the second set of processing resources, a second feedback message associated with the message for multicast operations, wherein the first feedback message and the second feedback message are hybrid automatic repeat request feedback messages.

27. The apparatus of claim 25, wherein the instructions are further for the at least one processor to cause the apparatus to:

transmit, to the network entity, a capability message indicating the first set of processing resources and the second set of processing resources, wherein receiving the message for unicast operations and receiving the message for multicast operations are based at least in part on transmitting the indication.

28. The apparatus of claim 25, wherein the instructions are further for the at least one processor to cause the apparatus to:
receive, from the network entity, a first control message comprising a grant of resources for the message for unicast operations, wherein receiving the message for unicast operations is based at least in part on receiving the first control message; and
receive, from the network entity, a second control message comprising a grant of resources for the message for multicast operations, wherein receiving the message for multicast operations is based at least in part on receiving the second control message.

29. The apparatus of claim 25, wherein the instructions are further for the at least one processor to cause the apparatus to:
receive, using the first set of processing resources, a first additional message for unicast operations or a first additional message for multicast operations from the network entity during a second TTI; and
receive, using the second set of processing resources, a second additional message for unicast operations or a second additional message for multicast operations from the network entity during the second TTI.

30. An apparatus for wireless communications at a network entity, comprising:
at least one processor, and
memory coupled with the at least one processor, the memory storing instructions for the at least one processor to cause the apparatus to:
receive, from a user equipment (UE), a capability message indicating a capability of the UE related to receiving both a message for unicast operations and a message for multicast operations during a same transmission time interval (TTI);
transmit, to the UE and based at least in part on a first quantity of blind decoding associated with a first set of search spaces, the message for unicast operations during a first TTI, the first set of search spaces associated with the message for unicast operations;
transmit, to the UE and based at least in part on a second quantity of blind decoding associated with a second set of search spaces, the message for multicast operations during the first TTI, the second set of search spaces associated with the message for multicast operations; and
receive, from the UE, a first feedback message associated with the message for unicast operations.

* * * * *